(12) United States Patent  (10) Patent No.: US 7,100,063 B2
Sasagawa  (45) Date of Patent: Aug. 29, 2006

(54) LOW POWER OPERATION CONTROL UNIT AND PROGRAM OPTIMIZING APPARATUS

(75) Inventor: Yukihiro Sasagawa, Soraku-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 389 days.

(21) Appl. No.: 10/764,511

(22) Filed: Jan. 27, 2004

(65) Prior Publication Data

US 2004/0187040 A1  Sep. 23, 2004

(30) Foreign Application Priority Data

Jan. 28, 2003  (JP) .............................. 2003-018106

(51) Int. Cl.
*G06F 1/26* (2006.01)

(52) U.S. Cl. ...................... 713/323; 320/321; 320/322; 320/323; 320/324; 712/43; 712/208; 712/229

(58) Field of Classification Search ........ 713/320–324; 712/43, 208, 229
See application file for complete search history.

(56) References Cited

U.S. PATENT DOCUMENTS

| 6,195,756 B1* | 2/2001 | Hurd ........................... 713/340 |
| 6,219,796 B1* | 4/2001 | Bartley ....................... 713/320 |
| 6,477,654 B1* | 11/2002 | Dean et al. .................. 713/300 |
| 6,535,984 B1* | 3/2003 | Hurd ........................... 713/320 |
| 6,859,886 B1* | 2/2005 | Johnson ....................... 713/600 |
| 6,892,312 B1* | 5/2005 | Johnson ....................... 713/320 |
| 7,020,787 B1* | 3/2006 | Takashima et al. .......... 713/320 |
| 2003/0070105 A1* | 4/2003 | Launiainen .................. 713/324 |
| 2004/0172547 A1* | 9/2004 | Okamoto et al. ............ 713/190 |

FOREIGN PATENT DOCUMENTS

| JP | 2778583 | 5/1998 |
| JP | 2001184208 | 7/2001 |

\* cited by examiner

*Primary Examiner*—A. Elamin
(74) *Attorney, Agent, or Firm*—Steptoe & Johnson LLP

(57) ABSTRACT

An objective is to perform a low power operation of a microprocessor on the pipeline stage of an instruction decode and a preceding pipeline stage without the necessity for increasing a circuit size or decoding time. An instruction code of each program for performing an instruction includes a first instruction set, which includes a flag for specifying predicate (301), and one or more second instruction sets including control specification information (302). A low power operation of each control circuit is performed for each instruction according to the instruction execution control function. Thus, without the necessity for increasing a circuit size or decoding time, it is possible to control the pipeline stage of an instruction decode and a preceding pipeline stage, achieving a low power operation of the microprocessor.

11 Claims, 22 Drawing Sheets

[NORMAL INSTRUCTION SET]

[LOW POWER INSTRUCTION SET]

FIG. 22A

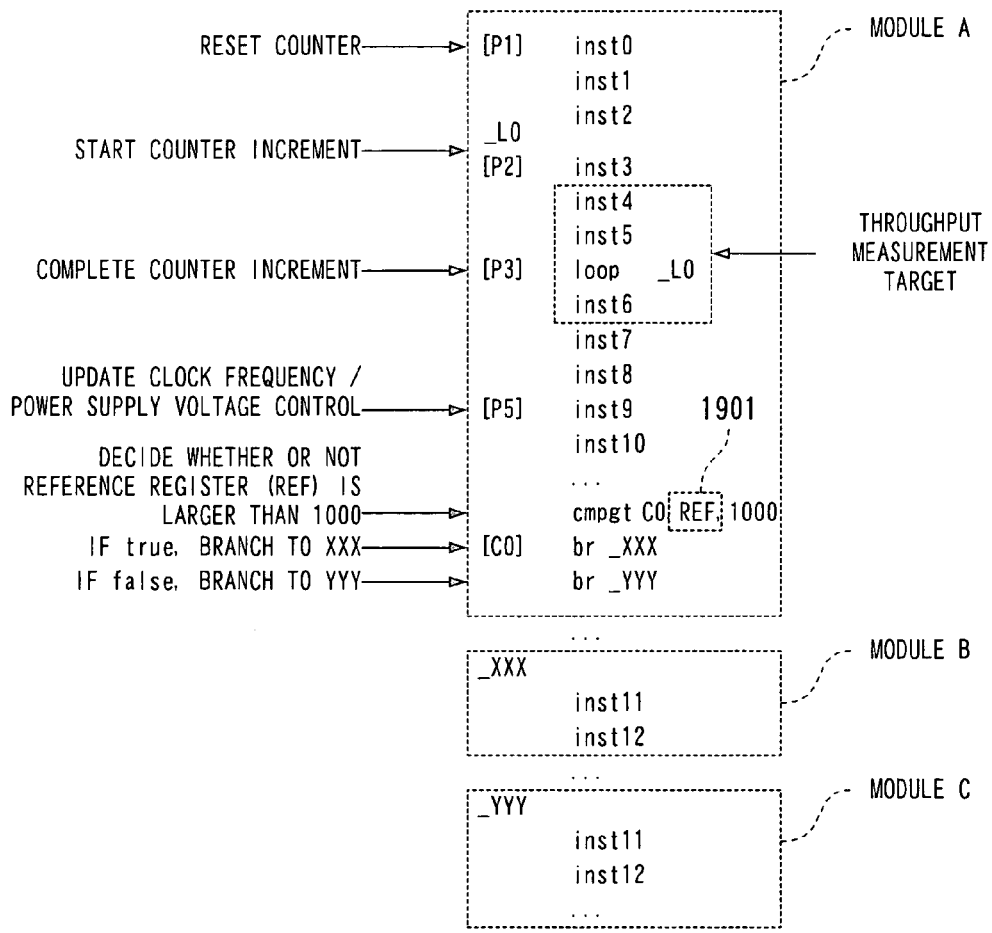

FIG. 22B

| PROGRAM HAVING NORMAL PREDICATE | | PROGRAM FOR DECIDING THROUGHPUT | | |
|---|---|---|---|---|
| [C0] | inst0 | [C0] | inst0 | |
| [C1] | inst1 | [P1] | inst1 | ← THROUGHPUT MEASUREMENT TARGET |
| [C1] | inst2 | [C1] | inst2 | |
| [C2] | inst3 | [P2] | inst3 | ← THROUGHPUT MEASUREMENT TARGET |
| [C2] | inst4 | [P2] | inst4 | ← THROUGHPUT MEASUREMENT TARGET |
| [C0] | inst5 | [P0] | inst5 | ← THROUGHPUT MEASUREMENT TARGET |
| [C0] | inst6 | [P0] | inst6 | ← THROUGHPUT MEASUREMENT TARGET |
| [C3] | inst7 | [C3] | inst7 | |
| [C3] | inst8 | [P3] | inst8 | ← THROUGHPUT MEASUREMENT TARGET |
| [C5] | inst9 | [P5] | inst9 | ← THROUGHPUT MEASUREMENT TARGET |
| [C5] | inst10 | [C5] | inst10 | |

LOW POWER OPERATION CONTROL UNIT AND PROGRAM OPTIMIZING APPARATUS

FIELD OF THE INVENTION

The present invention relates to a low power operation control unit for a microprocessor which comprises a function of controlling the execution of an instruction (hereinafter referred to as a predicating function) using a flag, and relates to a program optimizing apparatus.

BACKGROUND OF THE INVENTION

One of methods for achieving a low power operation in a microprocessor is an instruction discriminating method (e.g., Japanese Patent No. 2778583).

FIG. 1A is a structural diagram showing a low power operation control unit according to conventional instruction discrimination. FIG. 1B is an operational flow showing the low power operation control unit according to the conventional instruction discrimination.

In FIG. 1, an inputted instruction is decoded by a decoder (101), low power control contents are decided by a low power control circuit (102) based on a decoding result, and control is performed by a control signal (103), which stops the clock of a specific block, according to a decision result.

Further, another one of methods for achieving low power operation is a low power instruction set discriminating method (e.g., Japanese Patent Laid-Open No. 2001-184208).

FIG. 2A is a structural diagram showing an instruction set used for a conventional microprocessor. FIG. 2B is a structural diagram showing a low power operation control unit according to the conventional discrimination of an instruction set. FIG. 3 is an operational flow showing the low power operation control unit according to the conventional discrimination of an instruction set.

In FIGS. 2 and 3, in a low power instruction set which can be switched with a normal instruction set, the number of instructions is limited to generate a space in an instruction code format, and a format is set to define the contents of low power control in the space of the instruction code. The normal instruction set and the low power instruction set each has an instruction decoder (201). When the low power instruction set is used, low power control contents are decided by a low power control circuit (202), and control is performed by a control signal (203), which stops the clock of a specific block, according to a decision result.

However, regarding the above methods, in the instruction discriminating method of FIG. 1B, it is difficult or impossible to control a pipeline stage of an instruction decode and a preceding pipeline stage on a principle of decoding an instruction and performing control.

Moreover, in the low power instruction set discriminating method, information for low power control is acquired from a place other than an instruction decode and thus it is possible to control the pipeline stage of the instruction decode and a preceding pipeline stage. However, it is necessary to provide a plurality of instruction decoders and a circuit for selecting an instruction decode result according to a used instruction set and thus signal transmission paths (204) are increased by a larger circuit size, thereby increasing power consumption and decoding time.

In view of the above problem, an object of the present invention is to control the pipeline stage of an instruction decode and a preceding pipeline stage without the necessity for increasing a circuit size or decoding time, and achieve a low power operation of a microprocessor.

DISCLOSURE OF THE INVENTION

In order to attain the above objective, a first invention is a low power operation control unit mounted in a microprocessor having an instruction condition executing function using a condition flag, the control unit controlling a low power operation of the microprocessor, the control unit comprising a first instruction set including instruction execution control function information in a specific bit field of an instruction code inputted to a microprocessor, the information being used for selecting a flag for an instruction execution control function, and one or more second instruction sets including control specification information for low power control in the specific bit field, wherein the control unit comprises an operation mode switching circuit for switching the instruction sets to execute the first instruction set during a normal operation and execute the second instruction set during a low power operation, a predicate decision circuit for reading a flag corresponding to the instruction execution control function information in a first instruction set mode to discriminate an instruction execution control operation, a control specification information extraction circuit for extracting the control specification information of a control circuit for reading the control specification information in a second instruction set mode and performing a low power operation, and a controlling unit for performing a low power operation of each control circuit according to the control specification information, wherein the instruction execution control function information and the control specification information are provided beforehand in each program for executing an instruction, and the low power operation of each control circuit is performed for each instruction according to the control specification information, thereby controlling the low power operation of the microprocessor for each instruction.

A second invention is a low power operation control unit mounted in a microprocessor having an instruction condition executing function using a condition flag, the control unit controlling a low power operation of the microprocessor, the control unit comprising a first instruction set including instruction execution control function information in a specific bit field of an instruction code inputted to a microprocessor, the information being used for selecting a flag for an instruction execution control function, and one or more second instruction sets including control specification information for low power control in the specific bit field, wherein the control unit comprises an operation mode switching circuit for switching the instruction sets to execute the first instruction set during a normal operation and execute the second instruction set during a low power operation, a predicate decision circuit for reading a flag corresponding to the instruction execution control function information in a first instruction set mode to discriminate an instruction execution control operation, an event generating unit for reading the control specification information in a second instruction set mode and generating an event according to the control specification information, and a controlling unit for performing a low power operation of each control circuit in response to the event, where in the instruction execution control function information and the control specification information are provided beforehand in each program for executing an instruction, and the low power operation of each control circuit is performed for each instruction according to the control specification information, thereby controlling the low power operation of the microprocessor for each instruction.

A third invention is characterized in that the control circuit is an operation stop deciding unit for deciding an operation stopping point on a specific point of a program, the controlling unit is an operation stop control unit for performing control to stop an operation on a given point of the microprocessor based on a decision result of the operation stop deciding unit, and the low power operation of the microprocessor is controlled for each instruction by performing control to stop an operation on the given point of the microprocessor.

A fourth invention is characterized in that the control circuit is a power supply voltage deciding unit for deciding control on a power supply voltage on a specific point of a program, the controlling unit is a power supply voltage controlling unit for controlling a power supply voltage of the microprocessor based on a decision result of the power supply voltage deciding unit, and the low power operation of the microprocessor is controlled for each instruction by controlling the power supply voltage of the microprocessor.

A fifth invention is characterized in that the control circuit is a transistor body bias deciding unit for deciding control on a transistor body bias on a specific point of a program, the controlling unit is a transistor body bias controlling unit for controlling a transistor body bias of the microprocessor based on a decision result of the transistor body bias deciding unit, and the low power operation of the microprocessor is controlled for each instruction by controlling a transistor body bias of the microprocessor.

A sixth invention is characterized in that the control circuit is a clock frequency deciding unit for deciding control on a clock frequency on a specific point of a program, the controlling unit is a clock frequency controlling unit for performing control on a clock frequency based on a decision result of the clock frequency deciding unit, and the low power operation of the microprocessor is controlled for each instruction by controlling a clock frequency of the microprocessor.

A seventh invention is characterized in that one or more target microprocessors, each being a microprocessor other than the microprocessor comprising the event generating unit, or data processing units, comprise, as the controlling unit, an operation controlling unit for controlling the low power operation of the microprocessor or the data processing unit, and the low power controlling operation of the microprocessor or the data processing unit is controlled by the microprocessor comprising the event generating unit.

An eighth invention is characterized in that one or more target microprocessors, each being a microprocessor other than the microprocessor comprising the event generating unit, or data processing units, comprise a power supply controlling unit for controlling a lower power controlling operation by controlling, as the controlling unit, the power supply of the target microprocessor or the data processing unit, and the low power controlling operation of the target microprocessor or data processing unit is controlled by the microprocessor comprising the event generating unit.

A ninth invention is a microprocessor program optimizing apparatus for generating the instruction code, the apparatus comprising a power consumption calculating unit for calculating a power consumption of the operation stop control, the power supply voltage control, the transistor body bias control, or the clock frequency control based on the power consumption information of the microprocessor, an operation control candidate calculating unit for calculating a power consumption of an operation control circuit candidate of each instruction by using the power consumption, and a switching deciding unit for selecting the operation control circuit of each instruction to minimize the power consumption, wherein an instruction set switching instruction for switching the first instruction set and the second instruction set is inserted, and the control specification information of the second instruction set is determined, thereby to optimize the configuration of a program for performing a low power operation control.

A tenth invention is a low power operation control unit mounted in a microprocessor having an instruction condition executing function using a condition flag, the control unit controlling a low power operation of the microprocessor, the control unit comprising a first instruction set including instruction execution control function information in a specific bit field of an instruction code inputted to a microprocessor, the information being used for selecting a flag for an instruction execution control function, and one or more second instruction sets including control specification information for low power control in the specific bit field, wherein the control unit comprises an operation mode switching circuit for switching the instruction sets to execute the first instruction set during a normal operation and execute the second instruction set during a low power operation, a predicate decision circuit for reading a flag corresponding to the instruction execution control function information in a first instruction set mode to discriminate an instruction execution control operation, a control specification information extraction circuit for reading the control specification information in a second instruction set mode and extracting control specification information of a control circuit for performing a low power operation, a program through put measuring unit for measuring a throughput on a specific point of a program by using the control specification information, a throughput deciding unit for deciding an optimum power consumption for each program based on the throughput, a frequency/power supply controlling unit for controlling a frequency and a power supply voltage during program execution to have the optimum power consumption, and a controlling unit for performing control using the control specification information according to the frequency/power supply controlling unit of each control circuit based on the instruction execution control function, wherein the low power operation of the microprocessor is controlled for each instruction by measuring a throughput of a program corresponding to each instruction.

An eleventh invention is an operation control unit mounted in a microprocessor having an instruction condition executing function using a condition flag, the control unit controlling an operation of the microprocessor, the control unit comprising a first instruction set including instruction execution control function information in a specific bit field of an instruction code inputted to a microprocessor, the information being used for selecting a flag for an instruction execution control function, and one or more second instruction sets including control specification information for low power control in the specific bit field, wherein the control unit comprises an operation mode switching circuit for switching the instruction sets to execute the first instruction set during a normal operation and execute the second instruction set during a low power operation, a predicate decision circuit for reading a flag corresponding to the instruction execution control function information in a first instruction set mode to discriminate an instruction execution control operation, a control specification information extraction circuit for reading the control specification information in a second instruction set mode and extracting control specification information of a control circuit for performing a low power operation, a program throughput measuring unit for measuring a through put on a specific point of a program by using the control specification information, and a throughput referring unit for making reference to the throughput as a variable in a program of the microprocessor, wherein reference is made, during program execution, to a program through put obtained for each instruction of a program operation.

As described above, without the necessity for increasing a circuit size or decoding time, it is possible to perform control on the pipeline stage of an instruction decode and a preceding pipeline stage, achieving a low power operation of the microprocessor.

BRIEF DESCRIPTION OF THE DRAWINGS

FIG. 22A is a diagram for explaining that an operation is controlled based on a program throughput measurement result according to Embodiment 4 of the present invention; and FIG. 22B is a diagram showing a throughput decision in consideration of the presence or absence of predication according to Embodiment 4 of the present invention.

DESCRIPTION OF THE EMBODIMENTS

Figure 1A:
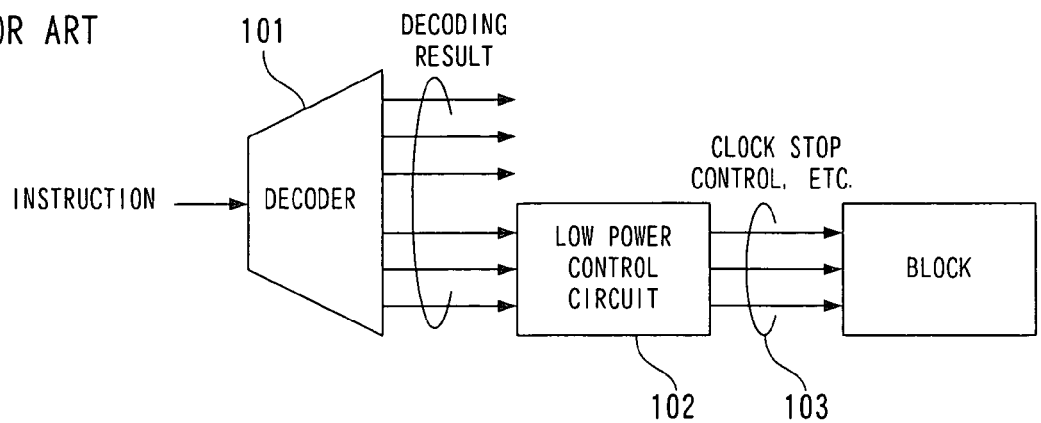
FIG. 1A is a structural diagram showing a low power operation control unit according to conventional instruction discrimination.
Figure 1B:
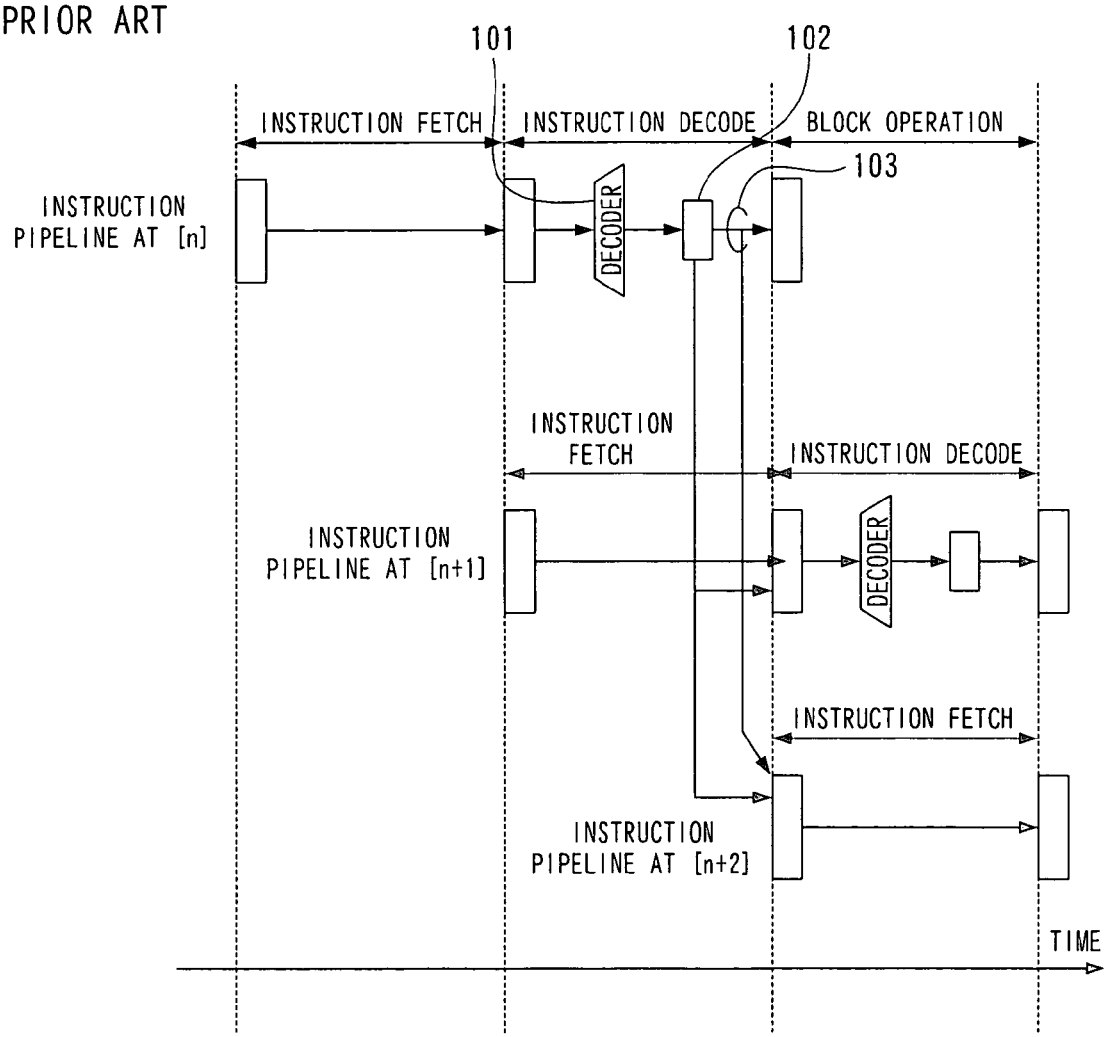
FIG. 1B is an operational flow showing the low power operation control unit according to the conventional instruction discrimination.
Figure 2A:
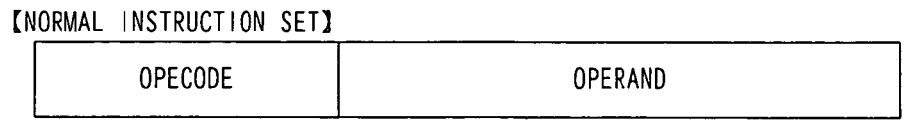
FIG. 2A is a structural diagram showing a conventional instruction set.
Figure 2A:
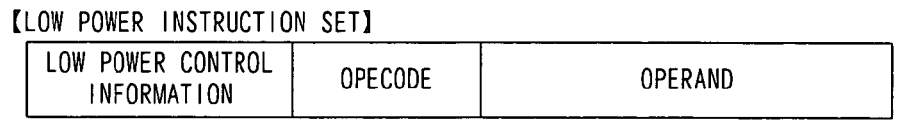
Figure 2B:
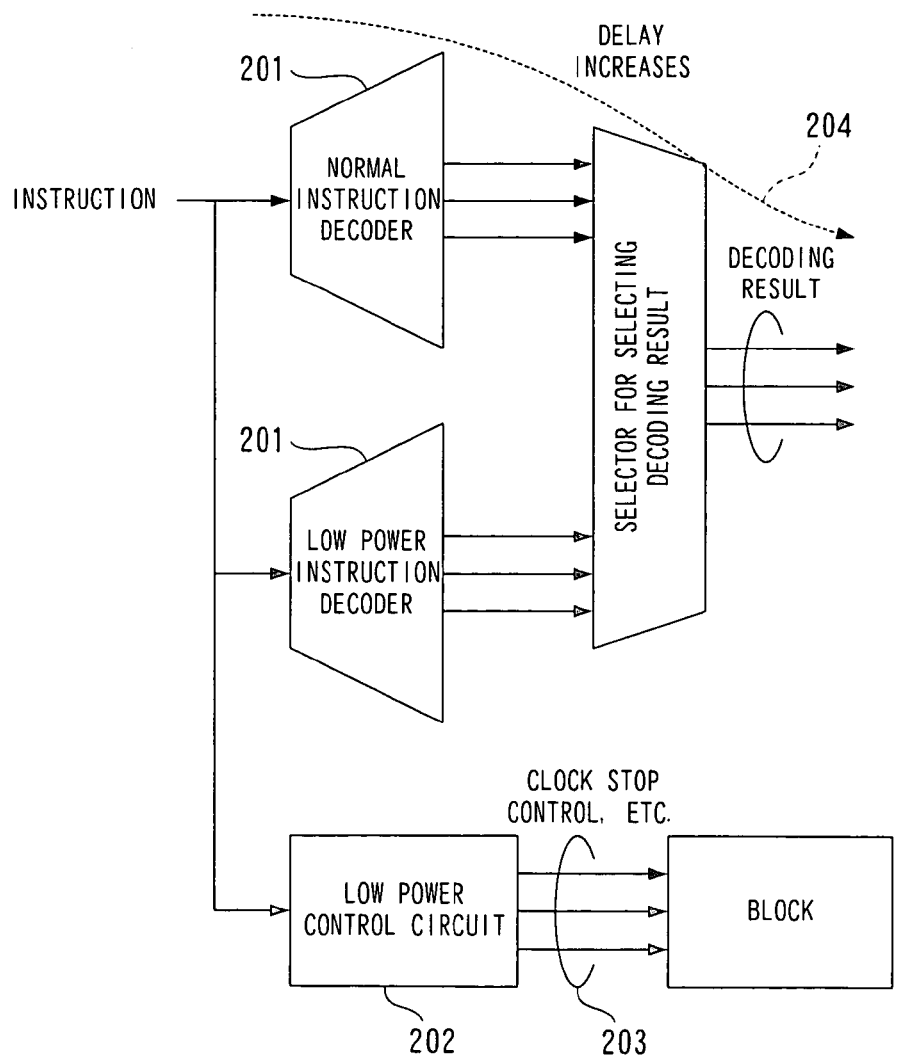
FIG. 2B is a structural diagram showing a low power operation control unit according to the conventional instruction set discrimination.
Figure 3:
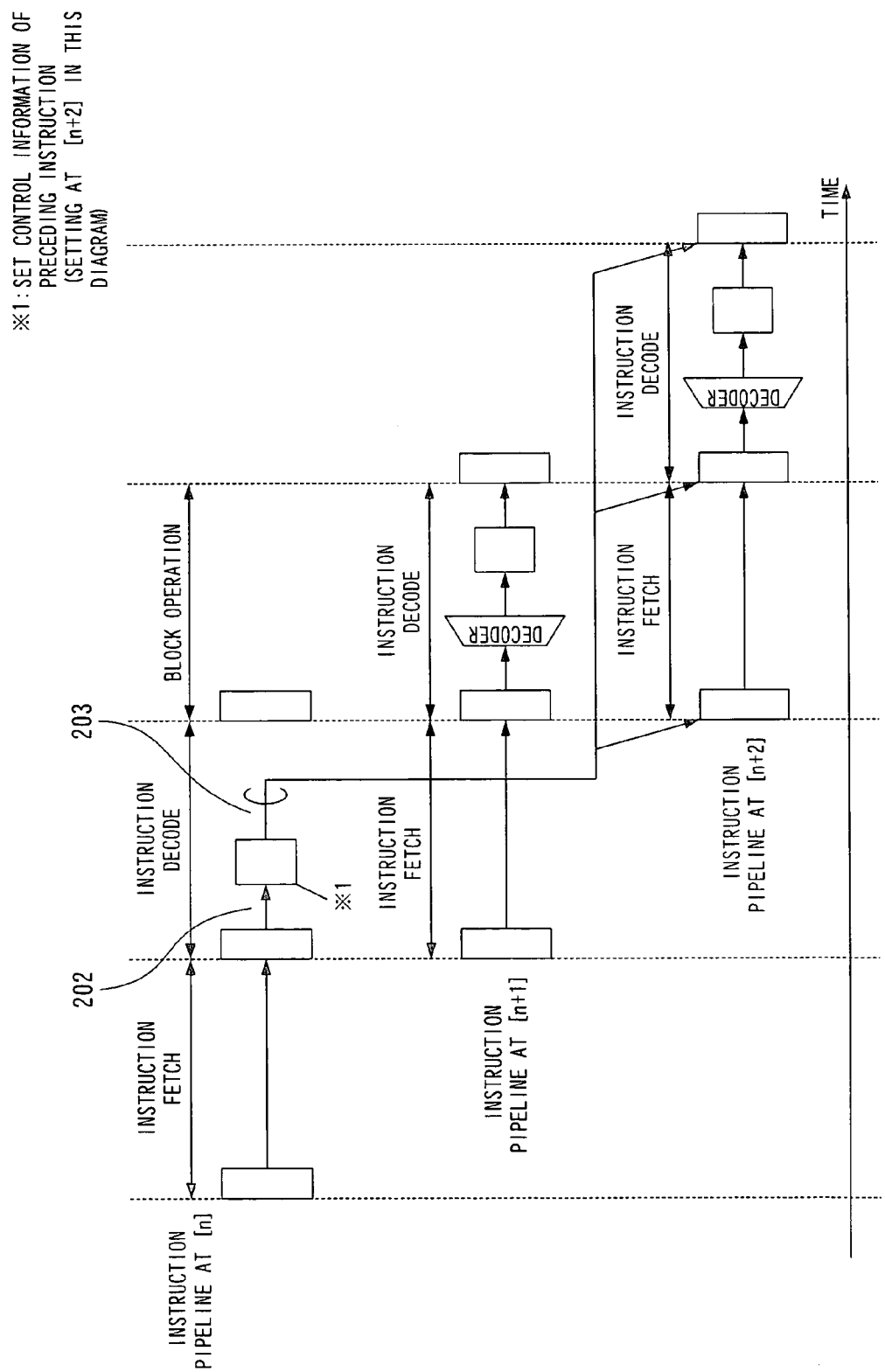
FIG. 3 is an operational flow showing the low power operation control unit according to the conventional instruction set discrimination.
Figure 4A:
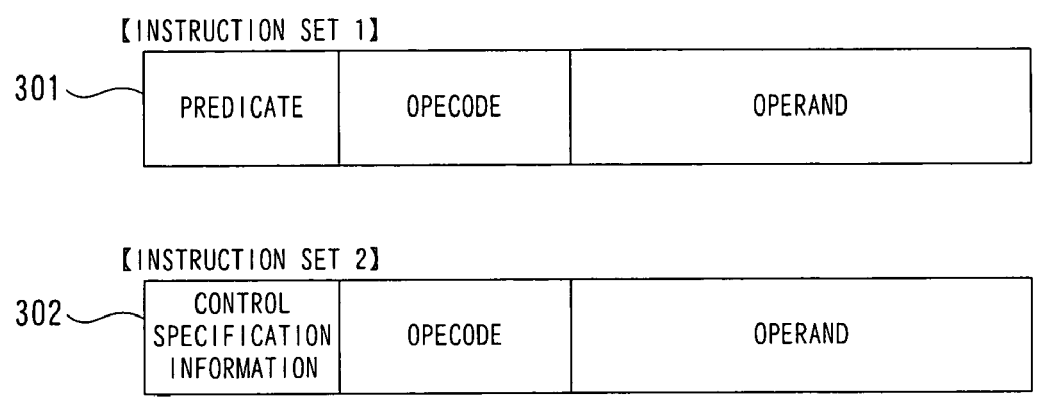
FIG. 4A is a structural diagram showing instruction sets used for a microprocessor in a low power operation control unit of the present invention.
Figure 4B:
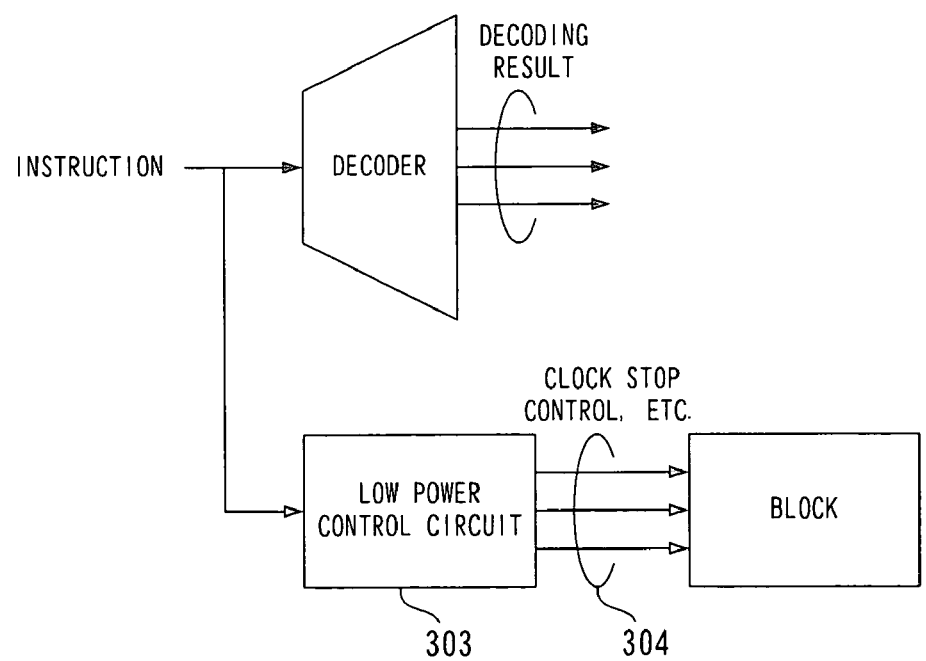
FIG. 4B is a structural diagram showing the low power operation control unit according to instruction set discrimination of the present invention.
Figure 5:
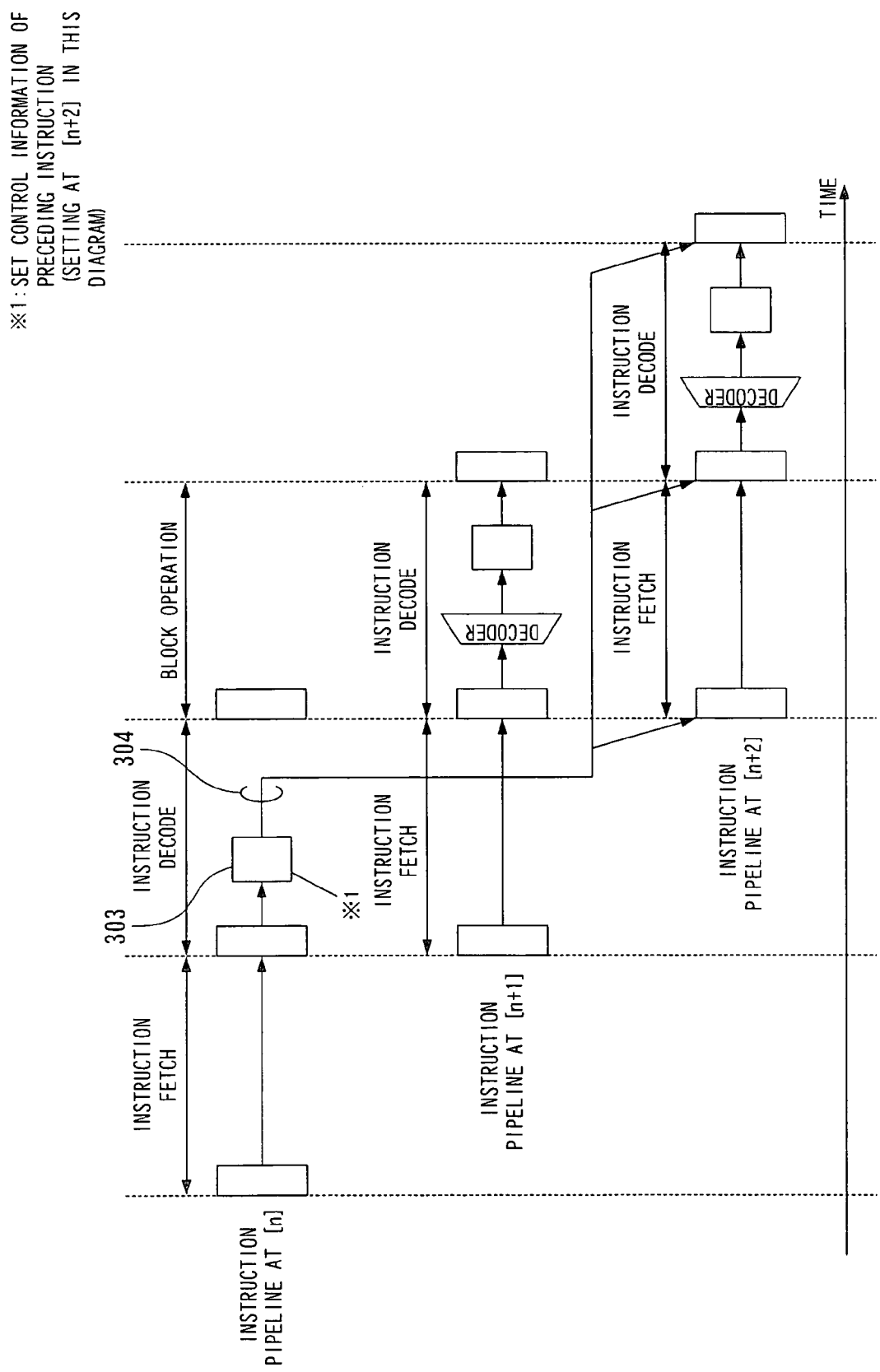
FIG. 5 is an operational flow showing the low power operation control unit according to the instruction set discrimination of the present invention.

Referring to FIGS. 4A, 4B, and 5, the concept of the present invention will be described below.

FIG. 4A is a structural diagram showing instruction sets used for a microprocessor in a low power operation control unit of the present invention. FIG. 4B is a structural diagram showing the low power operation control unit based on the instruction set discrimination of the present invention. FIG. is an operational flow showing the low power operation control unit based on the instruction set discrimination of the present invention.

A format called predication is available as an instruction execution format of the microprocessor. With the predication, it is decided whether or not an instruction should be executed depending upon flag information having been decided in the past. In general, when the predication is implemented, the configuration of an instruction code includes a predicate field (301), which is a bit field for storing identification information (predicate bit) for setting a flag. Execution/non-execution is decided depending upon the flag. As shown in FIG. 4, the present invention comprises, as instruction modes, an instruction set 1 for defining predicate specification information in the bit field and two or more kinds of instruction set 2 for defining control specification information (302) other than the predicate in the bit field. The instruction set 1 and the instruction set 2 are switched by a switching instruction during an operation of the microprocessor. By using a control signal (304) outputted from a low power control circuit (303), low power control is performed for each instruction unit during a program operation.

FIG. 5 shows a concept that the control signal (304) is used for controlling an instruction fetch, a pipe line register of an instruction decode stage, and a logical circuit in an instruction pipe line at [n+2]. It is understood that the control signal (304) is not generated by an instruction decoder but the low power control circuit (303) and control can be performed sufficiently on the instruction decode stage of the instruction pipeline at [n+2] and on a preceding pipeline stage (instruction fetch stage).

Further, since the instruction decoder refers to the same opecode and operand in a relationship between the instruction set 1 and the instruction set 2, it is not necessary to provide a plurality of instruction decoders.

Thus, without the necessity for increasing a circuit size or decoding time, it is possible to acquire information for low power control from a place other than an instruction decode and to perform control on the pipeline stage of the instruction decode and a preceding pipeline stage.

The following will describe embodiments of the present invention in accordance with the accompanying drawings.

Embodiment 1

Referring to FIGS. 6, 7, 8, 9, 10, and 11, the following will discuss a low power operation control unit according to Embodiment 1 of the present invention.

Figure 6:
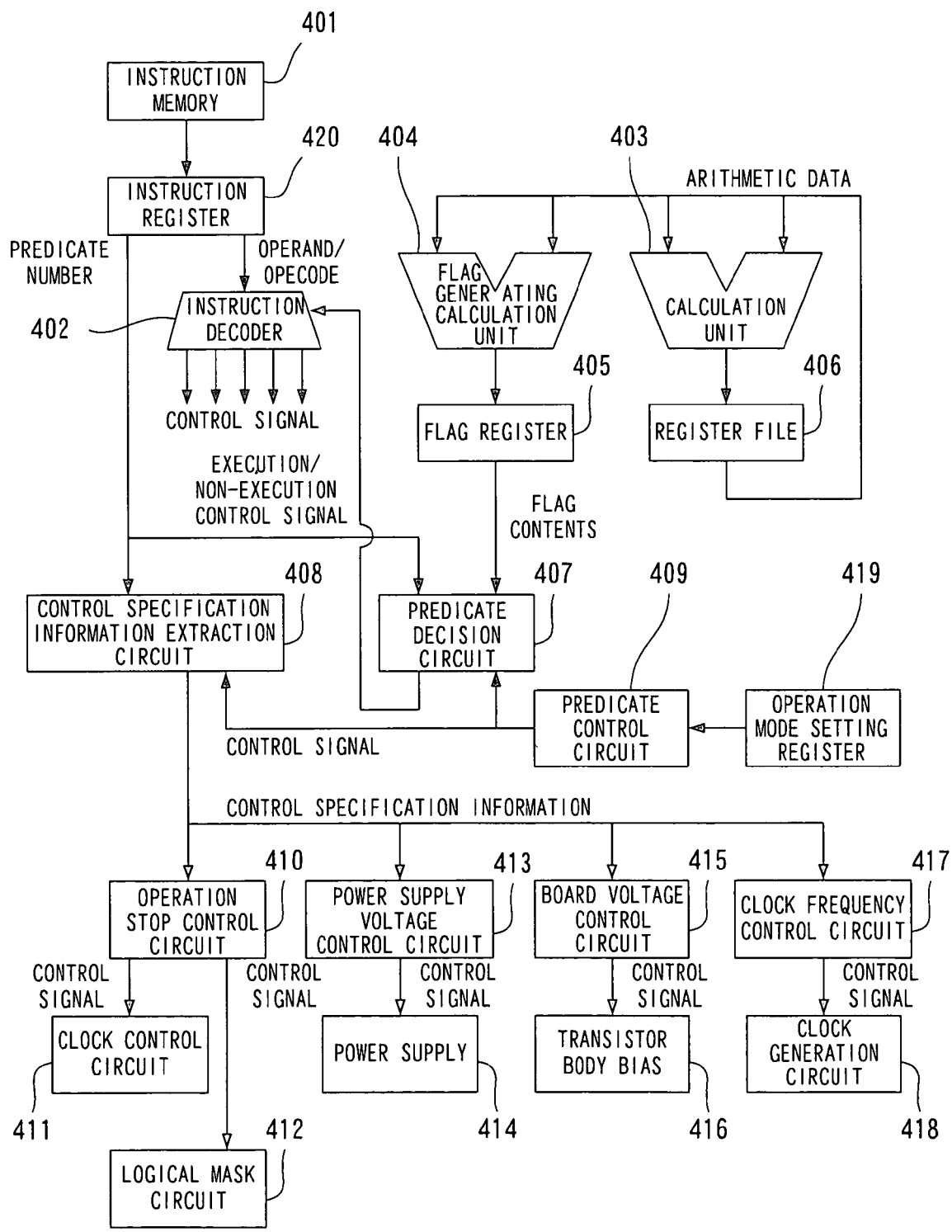
FIG. 6 is a structural diagram showing a microprocessor having the low power operation control unit of the present invention.

FIG. 6 is a structural diagram showing a microprocessor having the low power operation control unit of the present invention.

In FIG. 6, the microprocessor of the present invention is constituted of an instruction memory (401), an instruction register (420) for storing an instruction code acquired from the instruction memory (401), an instruction code decoder (402), a calculation unit (403), a flag generating calculation unit (404) used for predication, a flag register (405) for storing an arithmetic result of the flag generating calculation unit (404), a register file (406) for storing an arithmetic result, a predicate decision circuit (407) for deciding predication based on the contents of a predicate field in an instruction code and the output of the flag generating calculation unit (404), a control specification information extraction circuit (408) for extracting control specification information from the contents of the predicate field in the instruction code, a predicate control circuit (409) for instructing operations of the predicate decision circuit (407) and the control specification information extraction circuit (408) based on the partition and the operation mode of information allocated for predication and information allocated as control specification information in the contents of the predicate field, an operation stop control circuit (410) for controlling the stop of a clock and a logical mask according to the control specification information, a clock control circuit (411), a logical mask circuit (412) for fixing the input of a logical circuit at 0 or 1, a power supply voltage control circuit (413) for controlling a power supply voltage according to the control specification information, a power supply (414), a transistor body bias control circuit (415) for controlling a transistor body bias according to the control specification information, a transistor body bias (416), a clock frequency control circuit (417) for controlling a clock frequency according to the control specification information, a clock generation circuit (418) and an operation mode setting register (419) for defining an operation mode.

Figure 7:
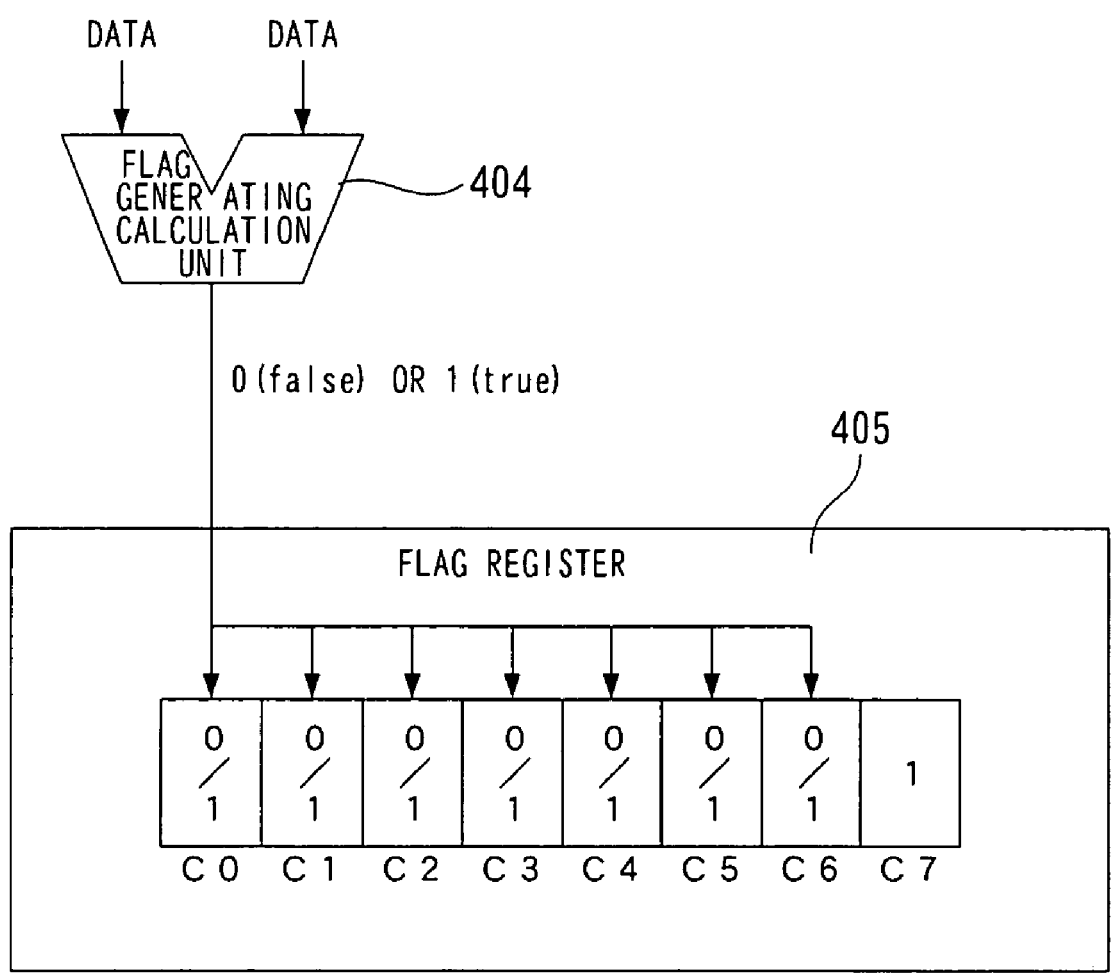
FIG. 7 is a structural diagram showing a flag register.

In the flag register (405) for storing the result of the flag generating calculation unit (404), eight flags (C0 to C7) are defined as the structural diagram of FIG. 7 showing the flag register. The flags are set or cleared according to arithmetic results. However, C7 is defined as a flag set at 1 all the time.

An example of setting a flag according to an operation is shown below where two pieces of data inputted to the flag generating calculation unit (404) are represented by A and B.

Cmp. EQ C0, A, B
: the contents of a register A and a register B are compared with each other. When the contents are coincident with each other, 1 is stored in C0. When the contents are not coincident with each other, 0 is stored in C0.

Cmp. GT C0, A, B
: the contents of the register A and the register B are compared with each other. When A>B is established, 1 is stored in C0. When A≦B is established, 0 is stored in C0.

Figure 8:
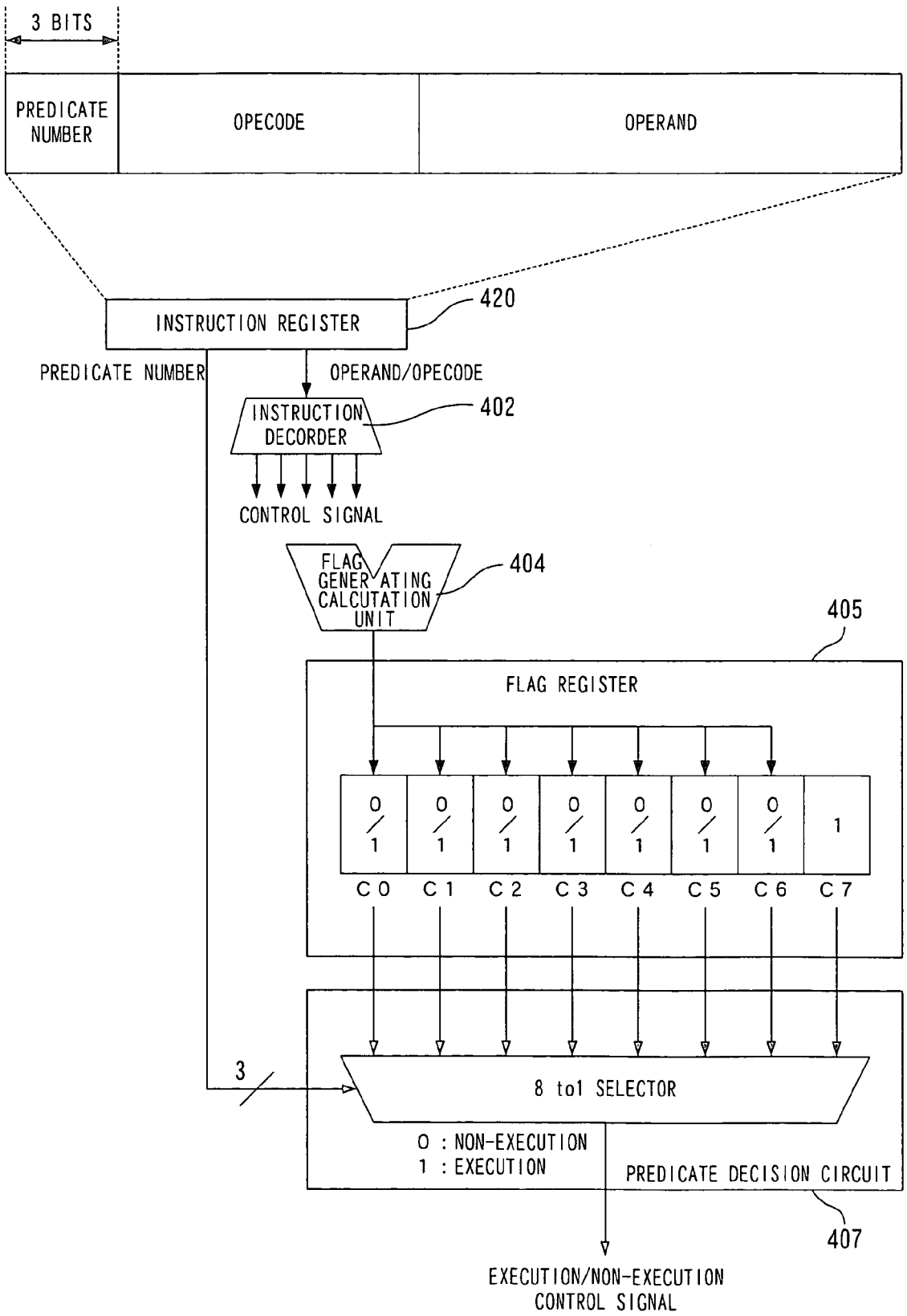
FIG. 8 is an explanatory drawing showing an instruction selection flow of the low power operation control unit according to the present invention.

As shown in FIG. 8, which is an explanatory drawing showing the instruction selection flow of the low power operation control unit according to the present invention, a 3-bit predicate field is present and eight flags of C0 to C7 can be set in the configuration of an instruction code. A flag is selected by designating a predicate number for each instruction, and whether the corresponding instruction should be executed or not is set depending upon whether the contents of the selected flag have 0 or 1. As described above, C7 is defined as a flag set at 1 all the time. Thus, when C7 is designated as a predicate number, "execution all the time" is indicated.

The operation mode setting register (419) has a bit for specifying any one of a normal operation and two or more low power modes. By combining a combination of the 3-bit predicate field and the contents combination of the operation mode setting register, it is possible to increase controllable types in a low power mode. Examples of the low power mode will be discussed below.

Low Power Mode 1
: the clock of an associated functional block and a power source supply are stopped and a logical mask is implemented for each kind of instructions, by using the control information of the predicate field.

Low Power Mode 2
: a clock frequency and a power supply voltage are controlled by using the control information of the predicate field.

Further, the information of the operation mode setting register (419) is supplied to the predicate control circuit (409) and is used for deciding predication and controlling control specification information.

Figure 9:
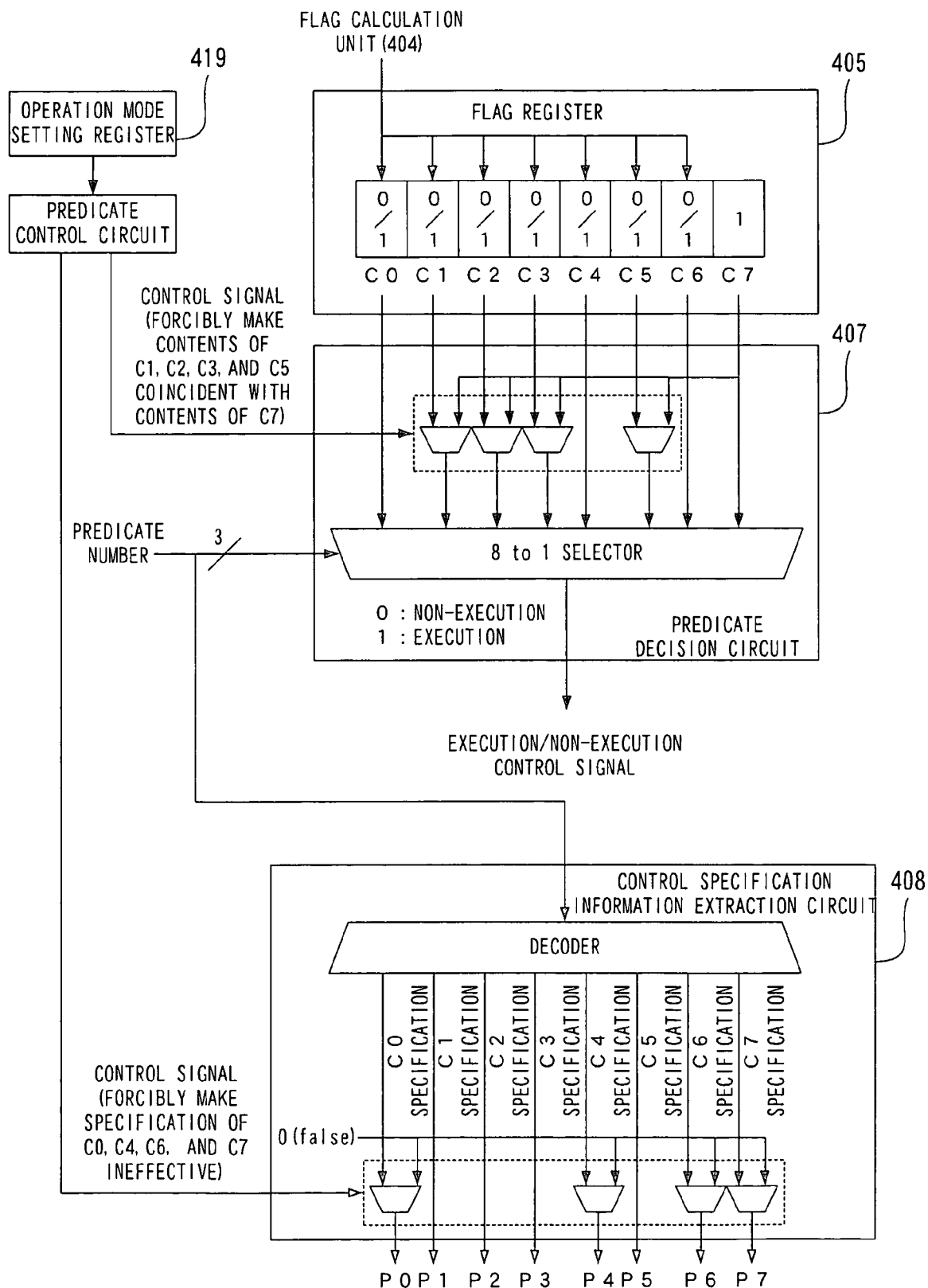
FIG. 9 is an explanatory drawing showing a low power mode of the present invention.

As shown in FIG. 9, which is an explanatory drawing showing the low power mode of the present invention, the use of the eight kinds of predicate numbers is limited in the low power mode. Only C0, C4, C6, and C7 are used in the low mode. P1, P2, P3, and P5 can be designated instead as power control information. Although the information stored in the predicate field does not change in appearance, when predicate numbers inputted to the predicate decision circuit (407) is C1, C2, C3, and C5, a change is forcibly made to the value of C7 during the low power mode. The control specification information extraction circuit (408) also refers to the predicate field. The predicate field is used as control information when predicate numbers are C1, C2, C3, and C5. With the series of operations, predicate numbers and power control information can be designated in the predicate field in a mixed manner. Besides, other combinations are available as methods of specifying the predicate field.

Figure 10:
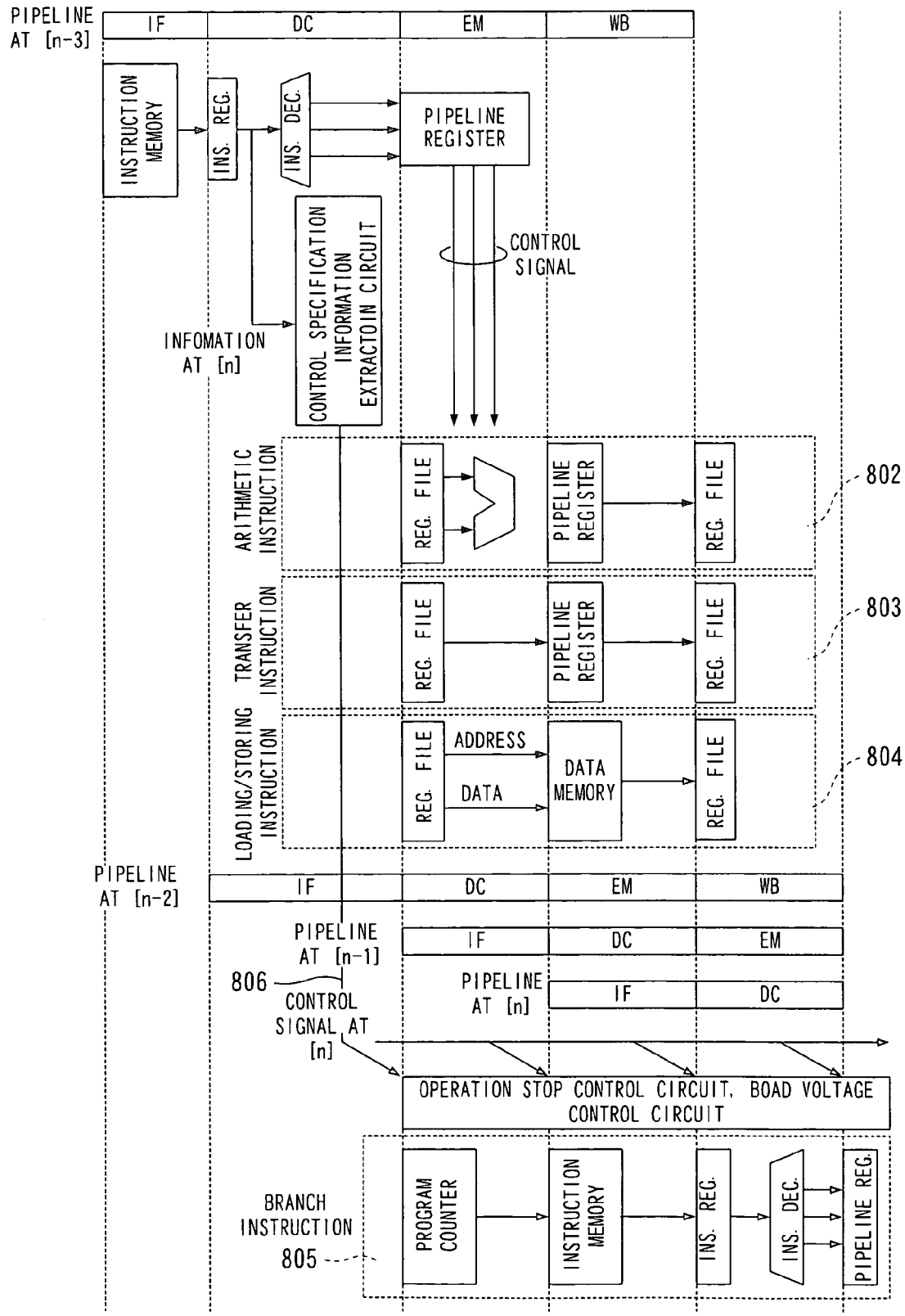
FIG. 10 is a diagram for explaining a controlling operation according to Embodiment 1 of the present invention.

As an example of the low power mode 1, a controlling operation using the operation stop control circuit (410), the clock control circuit (411), the logical mask circuit (412), the transistor body bias control circuit (415), and the board power supply (416) is realized as shown in FIG. 10, which is an explanatory drawing showing a controlling operation according to Embodiment 1 of the present invention. It is assumed that a low power mode for performing control using P1, P2, P3, and P5 is set as an operation mode. The power control information (P1, P2, P3, and P5) in this operation mode is defined as below.

P1: a loading/storing instruction is present after three instructions

P2: a transfer instruction is present after three instructions

P3: an arithmetic instruction is present after three instructions

P5: a branch instruction is present after three instructions

The clock of the functional block is fixed and a logical mask is implemented based on the power control information, and the operation of the functional block is stopped. While the operation of the functional block is stopped, a transistor body bias is controlled to reduce the leak current of a transistor and a threshold voltage (Vt) is increased.

The pipeline configuration of the microprocessor has instruction fetch (IF), decode (DC), arithmetic (EM), and write back (WB). Pipeline stages for executing the instructions are shown below.

Loading/storing instruction (804): two stages of EM and WB

Transfer instruction (803): EM stage

Arithmetic instruction (802): EM stage

Branch instruction (805): IF stage

Control is performed in each stage with the same concept as FIG. 5.

When clock control, logical mask, and transistor body bias control are performed in the configuration of FIG. 10, it is necessary to determine a control signal several cycles before in consideration of a delay time. In the present embodiment, it is assumed that a control signal has to be determined one cycle before. Thus, it is necessary to specify a state of the control signal three instructions before in consideration of the pipe line stage. As described above, since the power control information indicates control contents obtained after three instructions, the control signal is determined and an operation (806) can be performed for clock control, a logical mask, and transistor body bias control.

Figure 11:
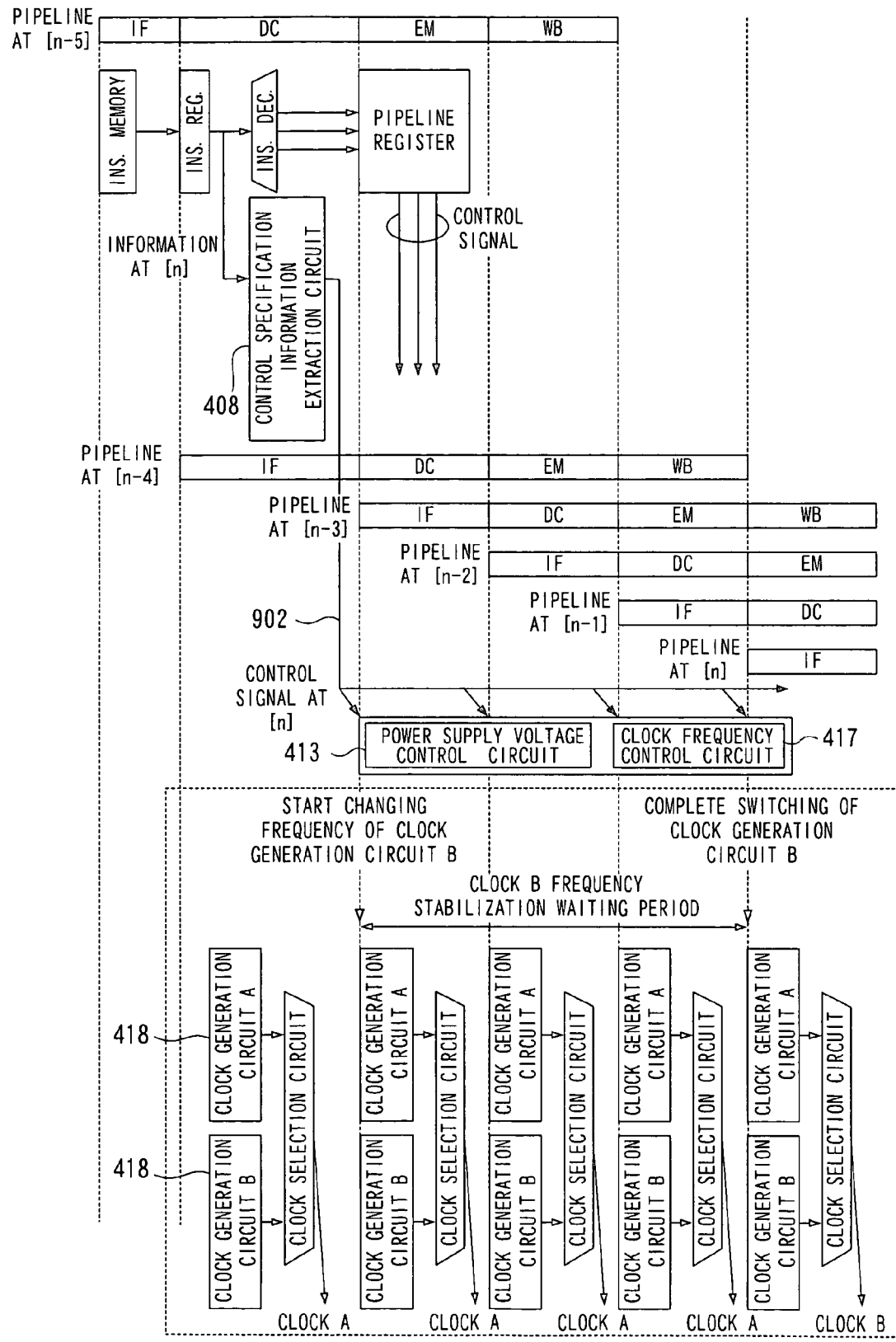
FIG. 11 is a diagram for explaining an operation of controlling a power supply voltage/clock frequency according to Embodiment 1 of the present invention.

As an example of the low power mode 2, power supply source/clock frequency control using the power supply voltage control circuit (413), the power supply (414), the clock frequency control circuit (417), and the clock generation circuit (418) is performed as shown in FIG. 11, which is an explanatory drawing showing power supply voltage/clock frequency control according to Embodiment 1 of the present invention. It is assumed that a low power mode for performing power supply voltage/clock frequency control using P1, P2, P3, and P5 is set as an operation mode. Power control information (P1, P2, P3, and P5) in this operation mode is defined as below.

P1: set a power supply voltage and a clock frequency at 100% of a base voltage after five instructions P2: set a power supply voltage and a clock frequency at 50% of the base voltage after five instructions P3: reduce a power supply voltage and a clock frequency by 5% after five instructions P4: increase a power supply voltage and a clock frequency by 5% after five instructions A power supply voltage and a clock frequency are controlled based on the power control information. The pipeline configuration of the microprocessor is the same as FIG. 8. Control is performed in each stage with the same concept as FIG. 5.

When a clock frequency is controlled in the configuration of FIG. 11, it is generally necessary to secure time for stabilizing a frequency.

As a unit for securing stabilization time when a frequency is switched, two clock generation circuits (418) are provided. When the clock generation circuits are switched after a frequency is stabilized, a control signal has to be determined several cycles before. It is assumed that the control signal has to be determined four cycles before in the present embodiment. Thus, it is necessary to specify a state of the control signal five commands before in consideration of the pipeline stage. As described above, since power control information (902) indicates control contents obtained five instructions later, the control signal is determined and thus a power supply voltage and a clock frequency can be controlled.

As described above, without the necessity for increasing a circuit size or decoding time, it is possible to control the pipeline stage of an instruction decode and a preceding pipeline stage, achieving a low power operation of the microprocessor.

Embodiment 2

Referring to FIGS. 12, 13, 14, 15, and 16, the following will discuss a method of generating an optimized program which has predicate information generated by a low power operation control unit according to Embodiment 2 of the present invention.

Figure 12:
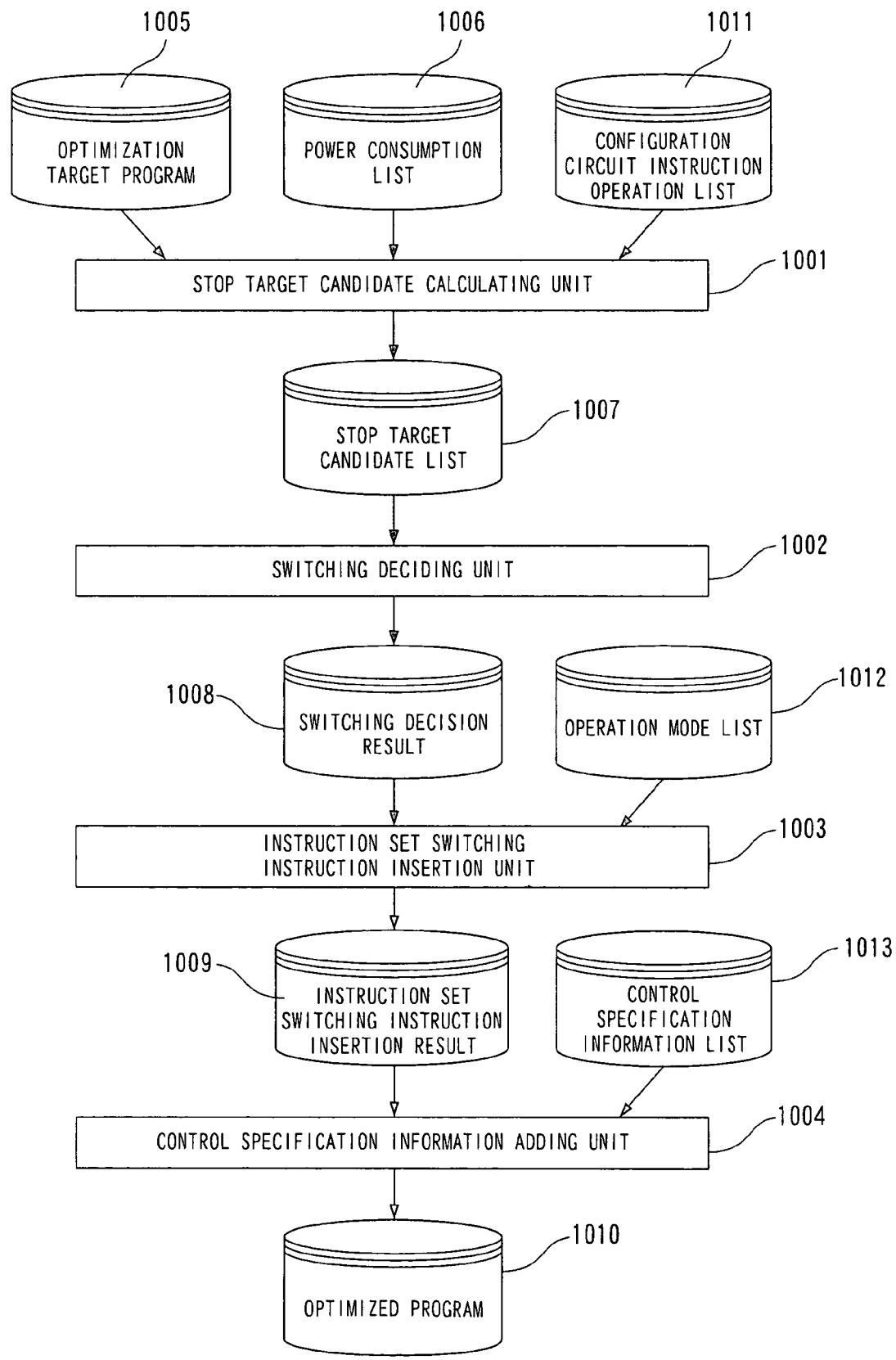
FIG. 12 is a diagram for explaining a program optimizer included in a low power operation control unit according to Embodiment 2 of the present invention.

FIG. 12 is a diagram for explaining a program optimizer according to Embodiment 2 of the present invention.

In FIG. 12, the program optimizer of a microprocessor is constituted of a stop target candidate calculating unit (1001), a switching decision unit (1002), an instruction set switching instruction insertion unit (1003), and a control specification information adding unit (1004). An optimization target program (1005), a power consumption list (1006) of the microprocessor or multiprocessor system component circuits, and an instruction operation list (1011) of the microprocessor or the multiprocessor system component circuits are inputted to the stop target candidate calculating unit (1001), and a stop target candidate list (1007) is outputted therefrom. The stop target candidate list (1007) is inputted to the switching decision unit (1002) and a switching decision result (1008) is outputted therefrom. The switching decision result (1008) and an operation mode list (1012) are inputted to the instruction set switching instruction insertion unit (1003), and an instruction set switching instruction insertion result (1009) is outputted therefrom. The instruction set switching instruction insertion result (1009) and a control specification information list (1013) are inputted to the control specification information adding unit (1004), and an optimized program (1010) is outputted therefrom.

Figure 13:
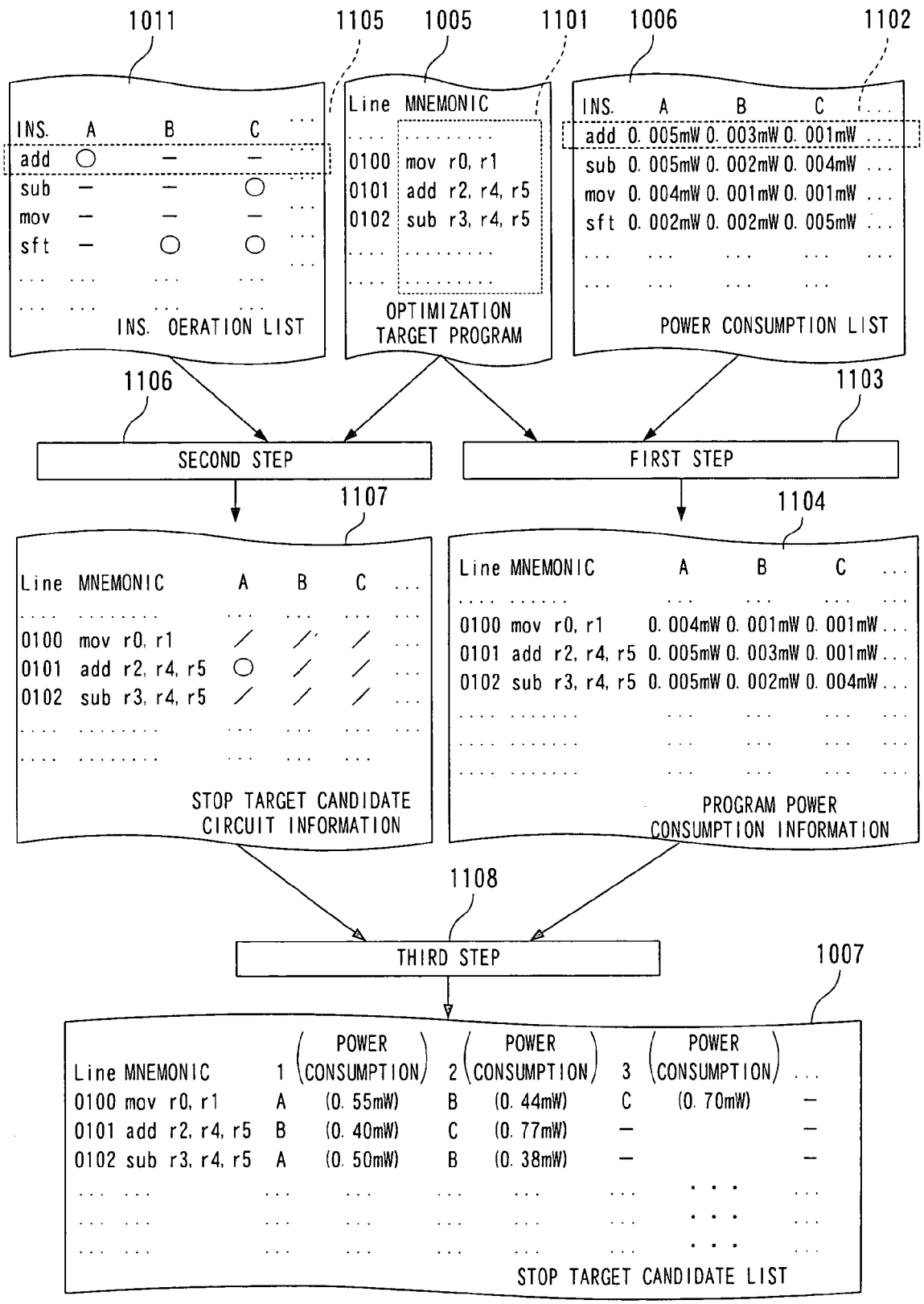
FIG. 13 is an operational flowchart showing a stop target candidate calculating unit.

FIG. 13 is an operational flowchart of the stop target candidate calculating unit. The flowchart is constituted of three steps.

In FIG. 13, the optimization target program (1005) is constituted of an instruction sequence (1101) of the microprocessor. The power consumption list (1006) of the microprocessors or the multiprocessor system component circuits includes the power consumption of each of the microprocessors or the multiprocessor system component circuits for each instruction of the microprocessor. For example, the list is configured as an example showing power consumption (1102) for each of the component circuits in FIG. 13.

First in an operation first step (1103), the power consumption of each of the microprocessors or the multiprocessor system component circuits is retrieved for each instruction of the optimization target program (1005) by using the power consumption list (1006), and program power consumption information (1104) is calculated.

The program power consumption information (1104) indicates power consumption when the microprocessor or the multiprocessor system component circuits are each operated on each line of the program. For example, Line 0101 in the program power consumption information (1104) of FIG. 13 is shown below.

Circuit A: 0.005 mW
Circuit B: 0.003 mW
Circuit C: 0.001 mW

The instruction operation list (1011) of the microprocessors or the multiprocessor system component circuits includes operation requiring points (1105) of the microprocessors or the multiprocessor system component circuits for each instruction of the microprocessor. The operation requiring point (1105) indicates a circuit requiring an operation at minimum to perform an instructing function.

Subsequently, in an operation second step (1106), the instruction operation list (1011) is used to perform retrieval on whether or not an operation is necessary on each of the microprocessors or the multiprocessor system component circuits for each instruction of the optimization target program (1005), and stop target candidate circuit information (1107) is calculated.

The stop target candidate circuit information (1107) indicates whether or not each of the microprocessors or the multiprocessor system component circuits can be stopped on each line of the program. For example, Line 0101 in the stop target candidate circuit information (1107) of FIG. 13 is shown below.

Circuit A: an operation is necessary (cannot be stopped)
Circuit B: stoppable
Circuit C: stoppable
...

Regarding the stoppable component circuits in the stop target candidate circuit information (1107), it is understood that power consumption on each line of the program can be estimated "on the assumption that the stoppable component circuits are stopped" with consideration of the power consumption obtained from the power consumption information 1104.

Namely, on Line 0101 in 1104 and 1107 of FIG. 13, the circuit B and the circuit C are stoppable and the circuit B has power consumption of 0.003 mW. "On the assumption that the circuit B is stopped," it is decided that the power consumption of Line 0101 can be estimated to be the total power consumption of the circuit A, circuit C, ... given that the circuit B has power consumption of 0 mW.

The circuit C has power consumption of 0.001 mW. "On the assumption that the circuit C is stopped," it is decided that the power consumption of Line 0101 can be estimated to be the total power consumption of the circuit A, circuit C, ... given that the circuit C has power consumption of 0 mW.

By using the above estimation, in an operation third step (1108), the stop target candidate circuit information (1107) and the program consumption power information (1104) are used to retrieve power consumption of each of the microprocessors or the multiprocessor system component circuits for each instruction of the optimization target program (1005) on the assumption that the stop target candidate circuits each have power consumption of 0, and a stop target candidate list (1007) is calculated.

The stop target candidate list (1007) indicates total power consumption on the assumption that stoppable circuits of the microprocessor and the multiprocessor system component circuits are stopped on each line of the program. Line 0101 in the stop target candidate list (1107) of FIG. 13 is shown below.

Circuit B is a stoppable candidate 1:
When the circuit B is stopped, the total power consumption of line 0101 is 0.40 mW.
Circuit C is a stoppable candidate 2:
When the circuit C is stopped, the total power consumption of line 0101 is 0.77 mW.

Figure 14:
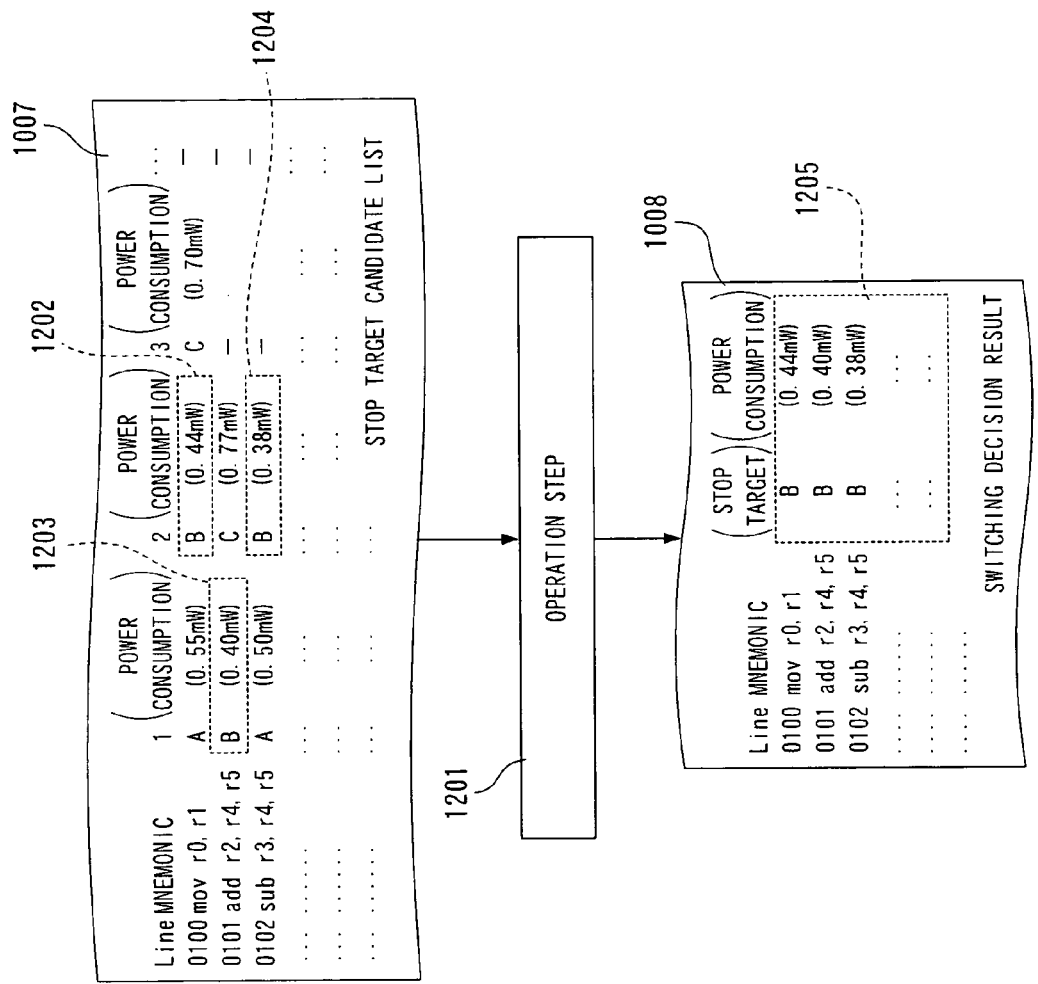
FIG. 14 is an operational flowchart showing a switching decision unit.

FIG. 14 is the operational flowchart of the switching decision unit, and the flowchart is composed of a single step.

In an operation step (1201), the stop target candidate list (1007) is used to retrieve the stop target candidate circuits (1202, 1203, 1204) having the lowest power consumption, a stop target circuit and power consumption (1205) are selected for each instruction of the optimization target program (1005), and a switching decision result (1008) is calculated.

Figure 15:
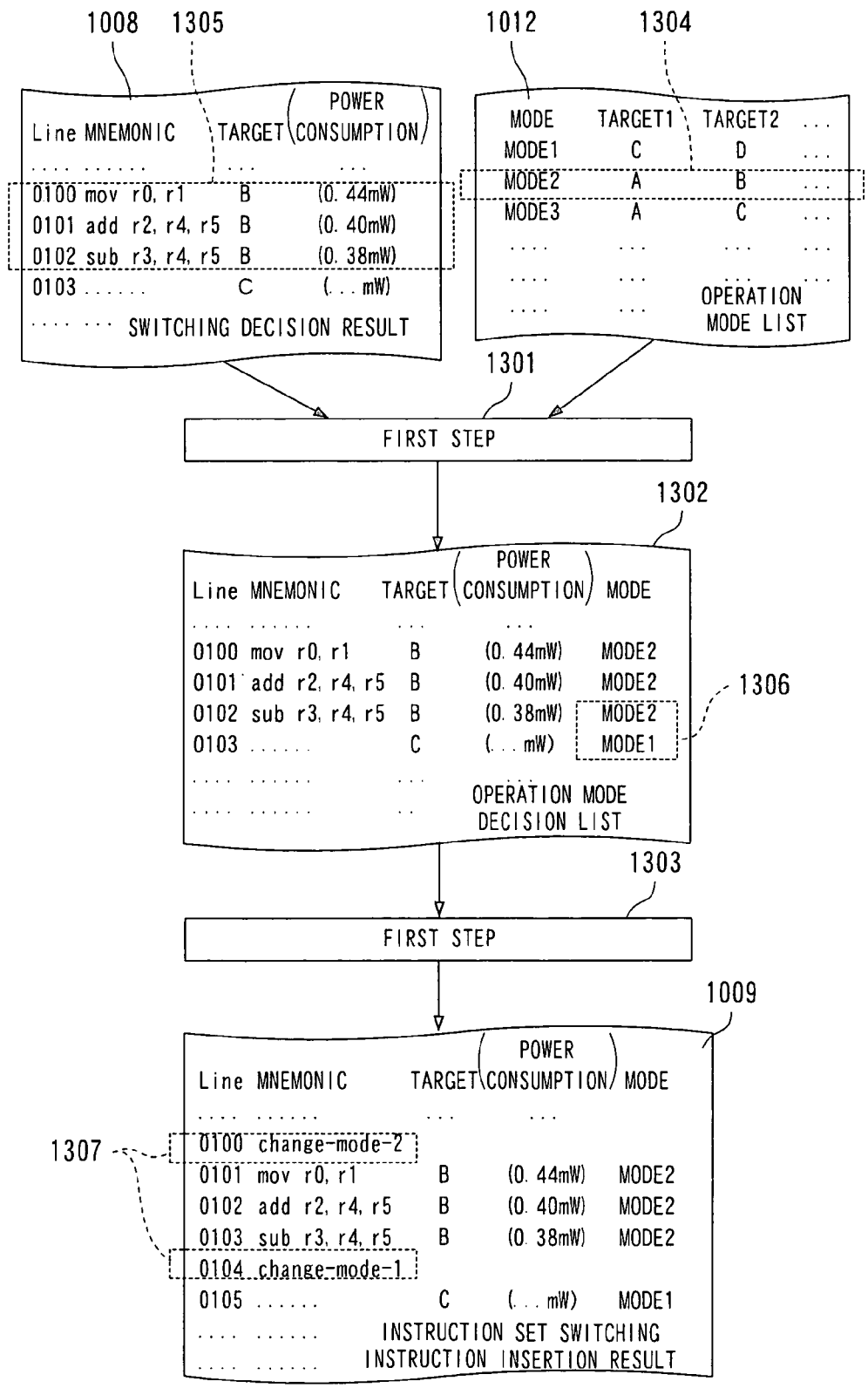
FIG. 15 is an operational flowchart showing an instruction set switching instruction insertion unit.

FIG. 15 is the operational flowchart of the instruction set switching instruction insertion unit, and the flowchart is composed of two steps.

In an operation first step (1301), the switching decision result (1008) and an operation mode list (1012) are used to calculate an operation mode for specifying a stop target for each instruction and an instruction sequence range where the same operation mode is applicable, based on a relationship (1304) of a target circuit corresponding to the operation mode of the optimization target program (1005) and a relationship (1305) between an instruction and the target circuit, and an operation mode decision result (1302) is outputted.

In an operation second step (1303), an operation mode changing point (1306) is retrieved where an operation mode is switched in the operation mode decision result (1302), an instruction set switching instruction (1307) is inserted which specifies an operation mode for each instruction sequence of the optimization target program (1005), and an instruction set switching instruction insertion result (1009) is calculated.

Figure 16:
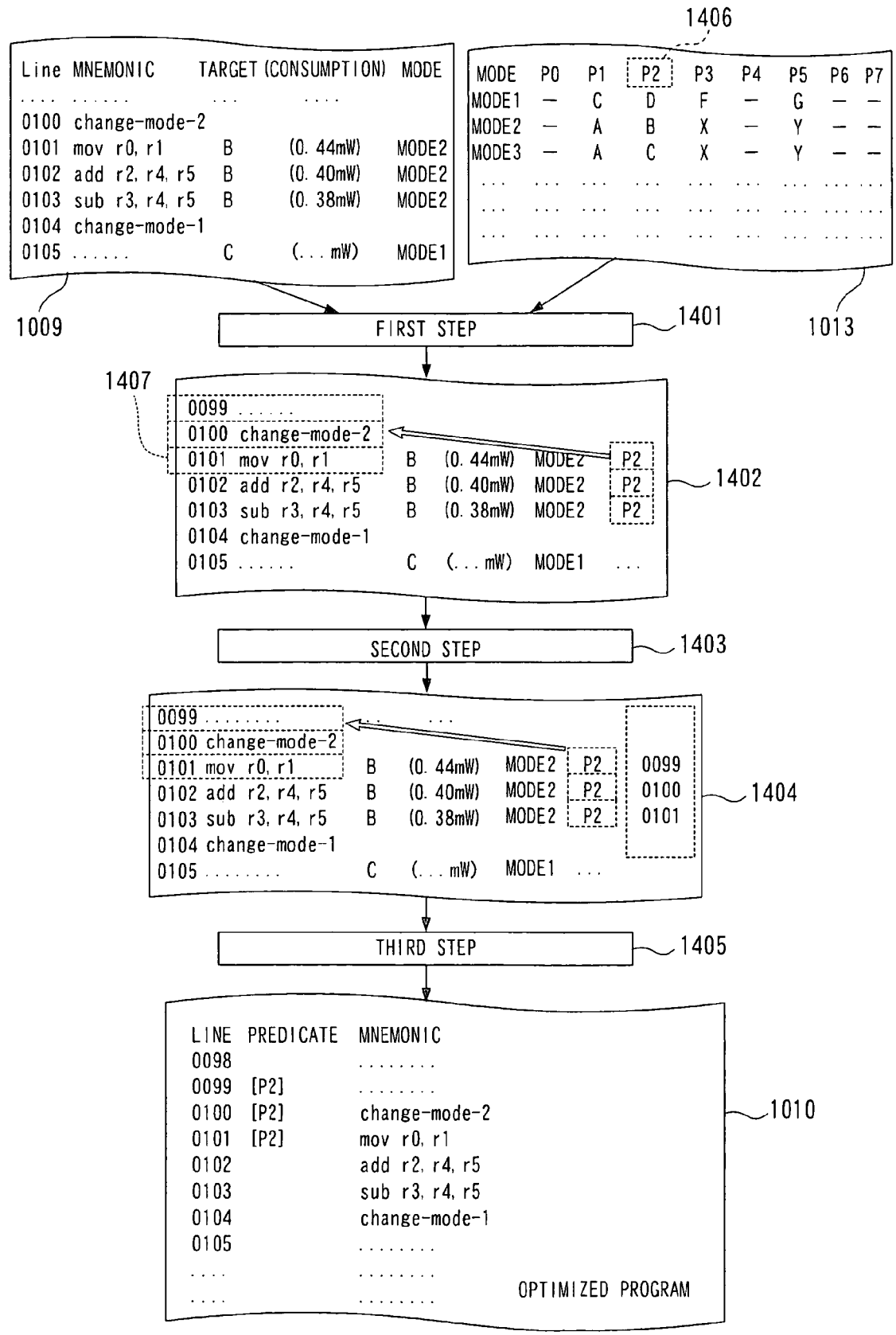
FIG. 16 is an operational flowchart showing a control specification information adding unit.

FIG. 16 is the operational flowchart of the control specification information adding unit, and the flowchart is composed of three steps.

In an operation first step (1401), the instruction set switching instruction insertion result (1009) and the control specification information list (1013) are used to retrieve a stop target circuit and control specification information (1406) corresponding to an operation mode for each instruction of the instruction set switching instruction insertion result (1009), and a control specification information decision result (1402) is outputted.

In an operation second step (1403), the control specification information decision result (1402) is used to retrieve an instruction sequence (1407) where control information can be determined a fixed cycle before, and a control specification information position (1404) is calculated. Additionally, the retrieving rule of the step is performed according to a cycle relationship of the control information described in FIGS. 10 and 11.

In an operation third step (1405), the control specification information decision result (1402) and the control specification information position (1404) are used to insert the control specification information for each instruction of the instruction set switching instruction insertion result, and an optimized program (1010) is calculated.

As described above, low power control is performed for each command unit by generating the optimized program having predicate information. Without the necessity for increasing a circuit size or decoding time, it is possible to perform control on the pipeline stage of the instruction decode and a preceding pipeline stage, achieving a low power operation of the microprocessor.

Embodiment 3

Figure 17:
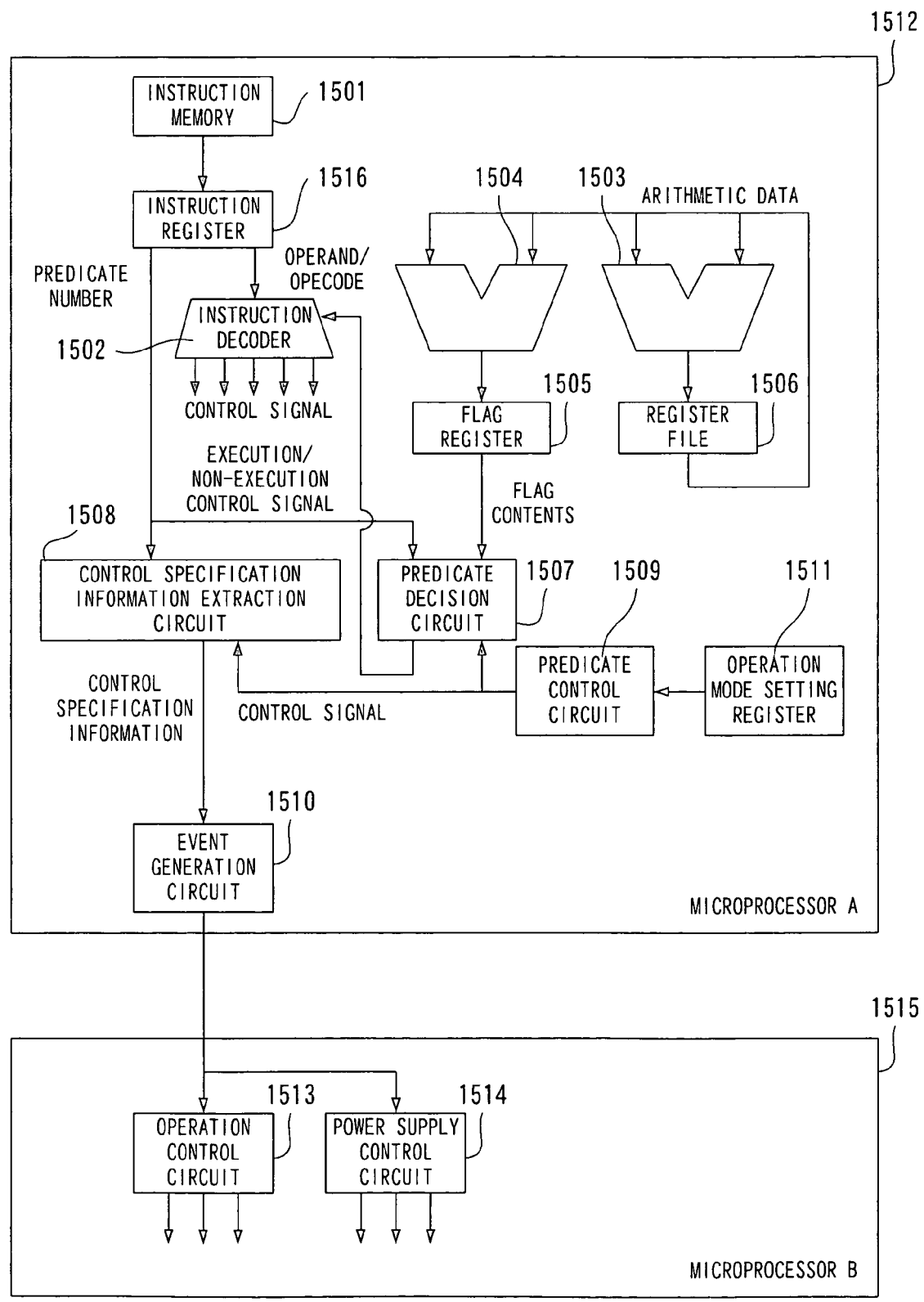
FIG. 17 is a structural diagram showing a microprocessor having a low power operation control unit and a peripheral circuit, according to Embodiment 3 of the present invention.
Figure 18:
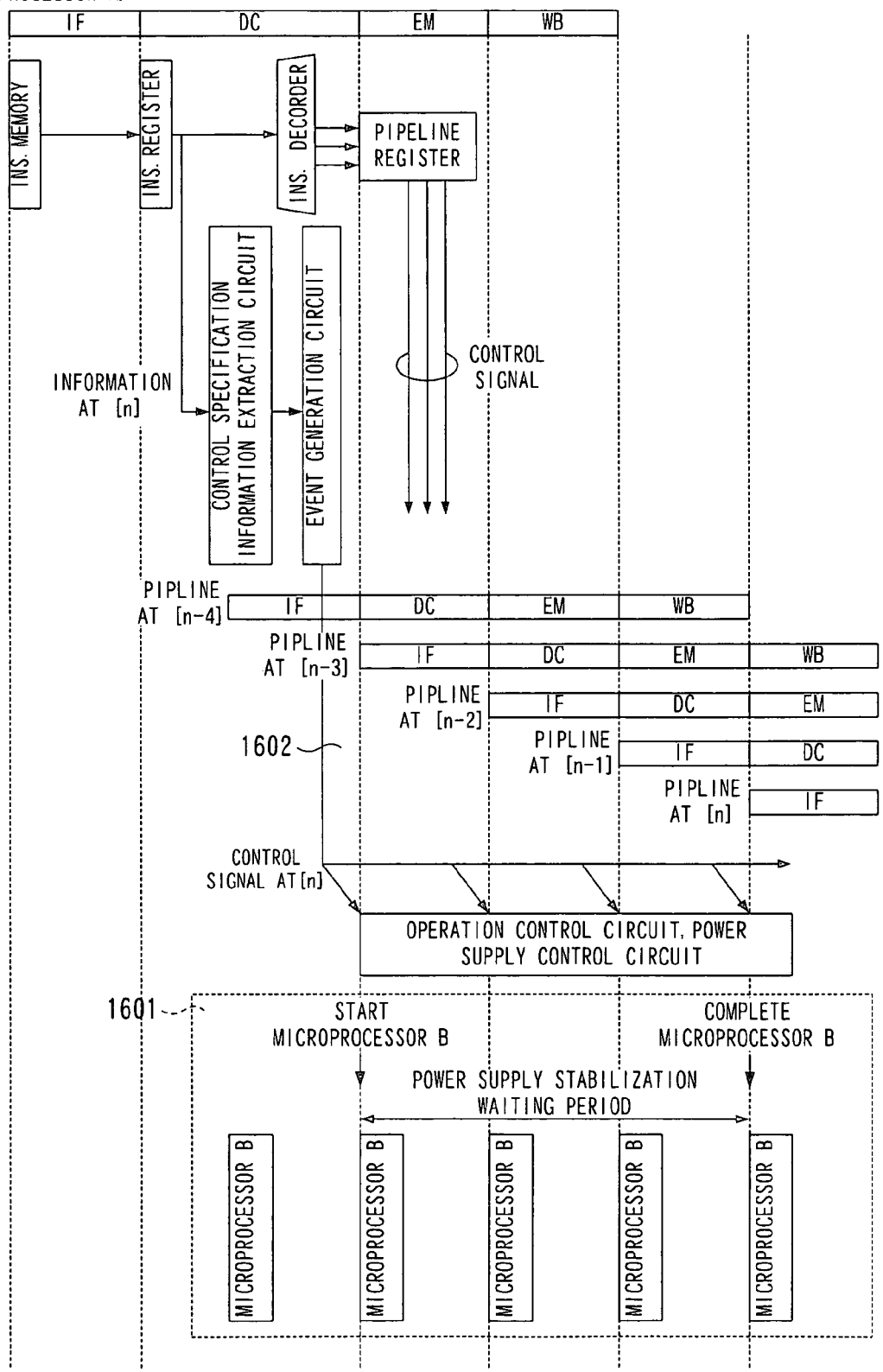
FIG. 18 is a diagram for explaining low power operation control in an event generation circuit according to Embodiment 3 of the present invention.

Referring to FIGS. 17 and 18, the following will describe a low power operation control unit according to Embodiment 3 of the present invention.

FIG. 17 is a structural diagram showing a microprocessor having the low power operation control unit and a data processing unit according to Embodiment 3 of the present invention. In this example, the data processing unit is also constituted of a microprocessor.

In FIG. 17, the multiprocessor system of the present invention is constituted of a microprocessor A (1512), an operation control circuit (1513), a power supply control circuit (1514), and a microprocessor B (1515). The microprocessor A (1512) is constituted of an instruction memory (1501), an instruction register (1516) for storing an instruction code acquired from the instruction memory, an instruction code decoder (1502), a calculation unit (1503), a flag generating calculation unit (1504) used for predication, a register (1505) for storing a result of the flag generating calculation unit, a register file (1506) for storing an arithmetic result, a predicate decision circuit (1507) for deciding predication based on the contents of a predicate field in an instruction code and the output of the flag generating calculation unit (1504), a control specification information extraction circuit (1508) for extracting control specification information from the contents of the predicate field in the instruction code, a predicate control circuit (1509) for instructing operations of the predicate decision circuit (1507) and the control specification information extraction circuit (1508) based on the partition and the operation mode of information allocated for predication and information allocated as control specification information in the contents of the predicate field, an event generation circuit (1510) which decides whether or not an event is necessary based on the control specification information and generates an event, and an operation mode setting register (1511) for defining an operation mode. The microprocessor B is controlled by the operation control circuit (1513) and the power supply control circuit (1514).

The register, predication, operation modes, and pipeline configuration of the microprocessor A (1512) are the same as FIGS. 6, 7, 8, 9, and 10 but the present embodiment is different in that an event is generated from the event circuit based on control specification information in a low power mode to control the microprocessor B (1515). That is, the low power operation control of the microprocessor B is performed by the microprocessor A. The following will discuss the case where the low power operation control of the microprocessor B is performed by the microprocessor A. The control maybe performed by a data processing unit other than the microprocessor.

Further, the following will describe that the low power operations of different microprocessors are controlled. The microprocessor for generating an event may be controlled.

Control on the microprocessor B (1515) by means of the event generation circuit is realized as shown in FIG. 18 which is an explanatory drawing showing low power operation control using the event generation circuit according to Embodiment 3 of the present invention. It is assumed that a low power mode for performing control using P1, P2, P3, and P5 is set as an operation mode of the microprocessor A. The power control information (P1, P2, P3, and P5) in this operation mode is defined as below.

P1: start the microprocessor B after five instructions
P2: stop the microprocessor B after five instructions
P3: turn on the power of the microprocessor B after five instructions
P5: turn off the power of the microprocessor B after five instructions The operation and supply power of the microprocessor B are controlled based on the power control information. When the operation and supply power of the microprocessor B are controlled, time is required for startup and stable power supply and thus an event has to be generated several cycles before. In the present embodiment, an event is generated as indicated by control signal timing (1601) and four cycles are necessary from when the microprocessor B (1515) is started to when the start is completed. Hence, in consideration of a pipeline stage, the state of the event has to be specified five instructions before. However, as described above, the power control information indicates the contents of the event obtained five instructions later. Thus, the event occurs and the operation of the microprocessor B and a power supply controlling operation (1602) can be performed.

As described above, without the necessity for increasing a circuit size or decoding time, it is possible to control the pipeline stage of an instruction decode and a preceding pipeline stage, achieving a low power operation of the microprocessor.

Embodiment 4

Referring to FIGS. 19, 20, 21, and 22, the following will discuss a low power operation control unit according to Embodiment 4 of the present invention.

Figure 19:
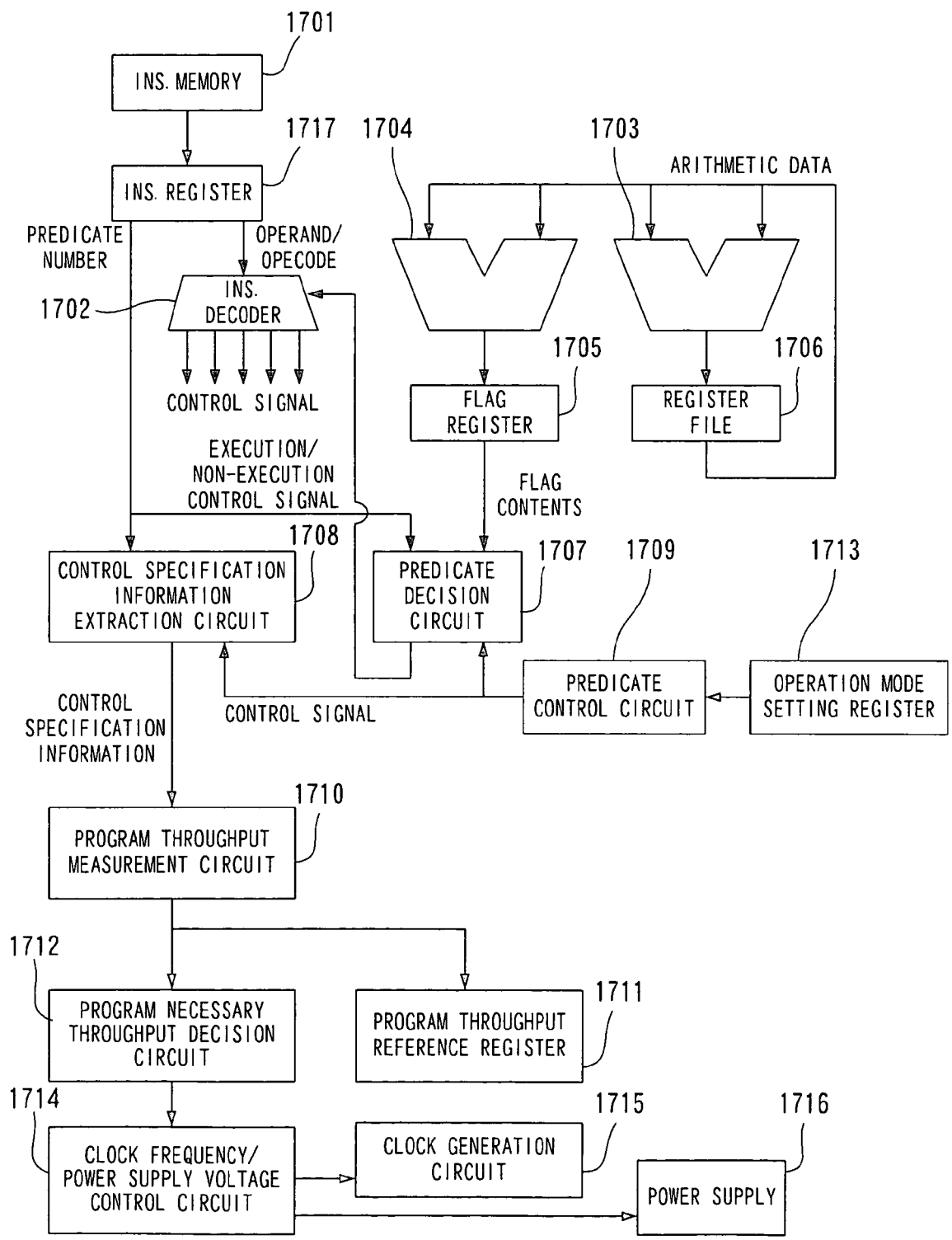
FIG. 19 is a structural diagram showing a microprocessor having a low power operation control unit according to Embodiment 4 of the present invention.

FIG. 19 is a structural diagram showing a microprocessor having the low power operation control unit according to Embodiment 4 of the present invention.

The microprocessor of the present invention is constituted of an instruction memory (1701), an instruction register (1717) for storing an instruction code acquired from the instruction memory (1701), an instruction code decoder (1702), a calculation unit (1703), a flag generating calculation unit (1704) used for predication, a register (1705) for storing a result of the flag generating calculation unit (1704), a register file (1706) for storing an arithmetic result, a predicate decision circuit (1707) for deciding predication based on the contents of a predicate field in an instruction code and the output of the flag generating calculation unit (1704), a control specification information extraction circuit (1708) for extracting control specification information from the contents of the predicate field in the instruction code, a predicate control circuit (1709) for instructing operations of the predicate decision circuit (1707) and the control specification information extraction circuit (1708) based on the partition and the operation mode of information allocated for predication and information allocated as control specification information in the contents of the predicate field, a program throughput measurement circuit (1710) for measuring a program throughput based on the control specification information, a program throughput measurement result reference register (1711) for referring to a measurement result, a program through put decision circuit (1712) which decides a necessary throughput of a program by using the measurement result and outputs the result, an operation mode setting register (1713) for defining an operation mode, a clock frequency/power supply voltage control circuit (1714) which is controlled by a decision result on a necessary throughput of a program, a clock generation circuit (1715), and a power supply (1716).

The register, predication, operation modes, and pipeline configuration of the microprocessor are the same as FIGS. 6, 7, 8, 9, and 10. The present embodiment is different in that a necessary program throughput is calculated by the program throughput decision circuit based on control specification information in a low power mode and a clock frequency/power supply voltage is controlled.

Figure 20:
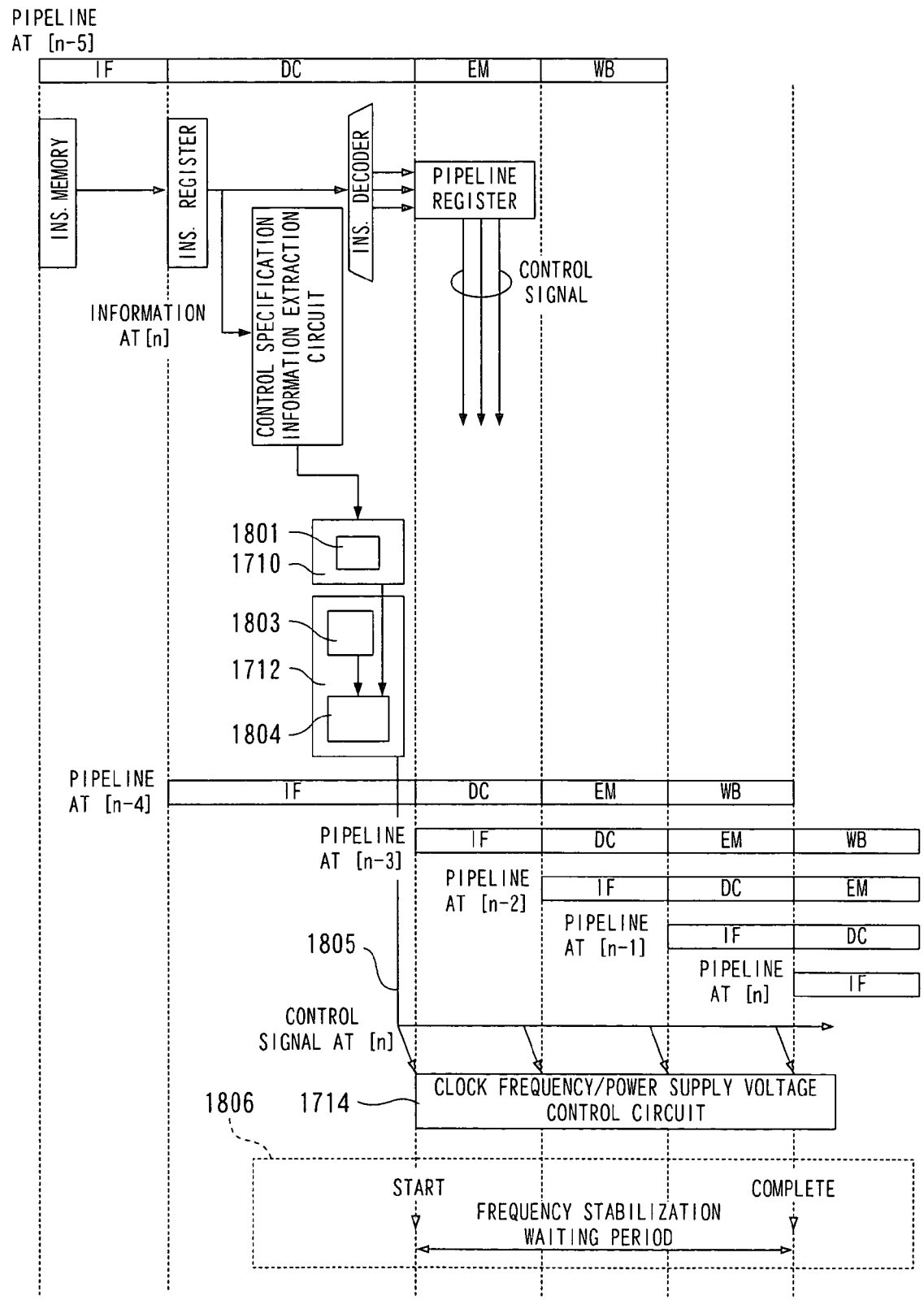
FIG. 20 is a diagram for explaining low power operation control performed by measuring a program throughput according to Embodiment 4 of the present invention.
Figure 21A:
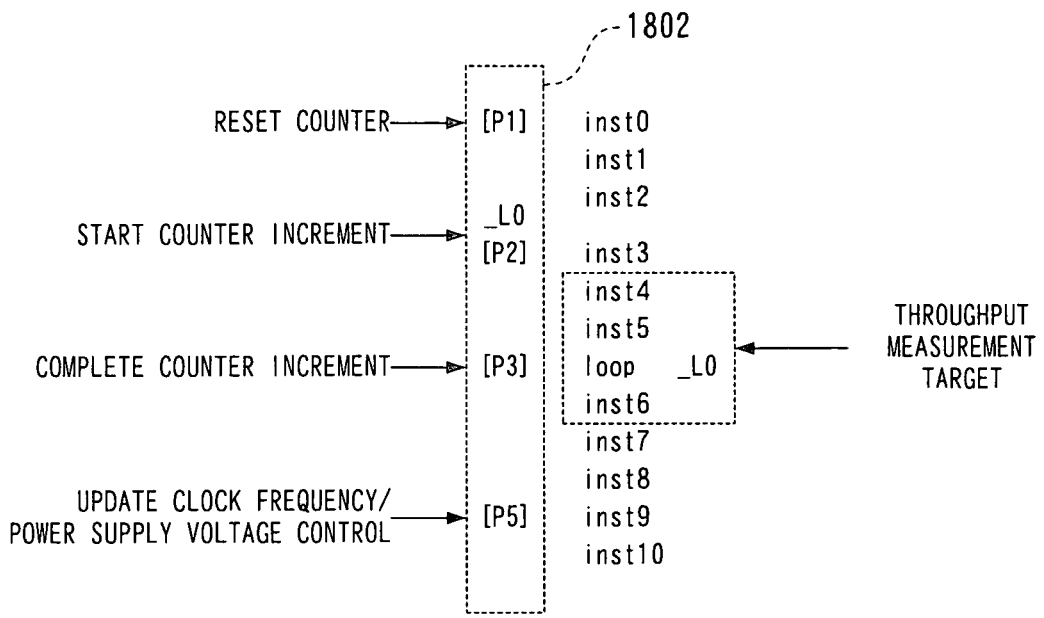
FIG. 21A is a diagram showing a program throughput measurement result according to Embodiment 4 of the present invention.
Figure 21B:
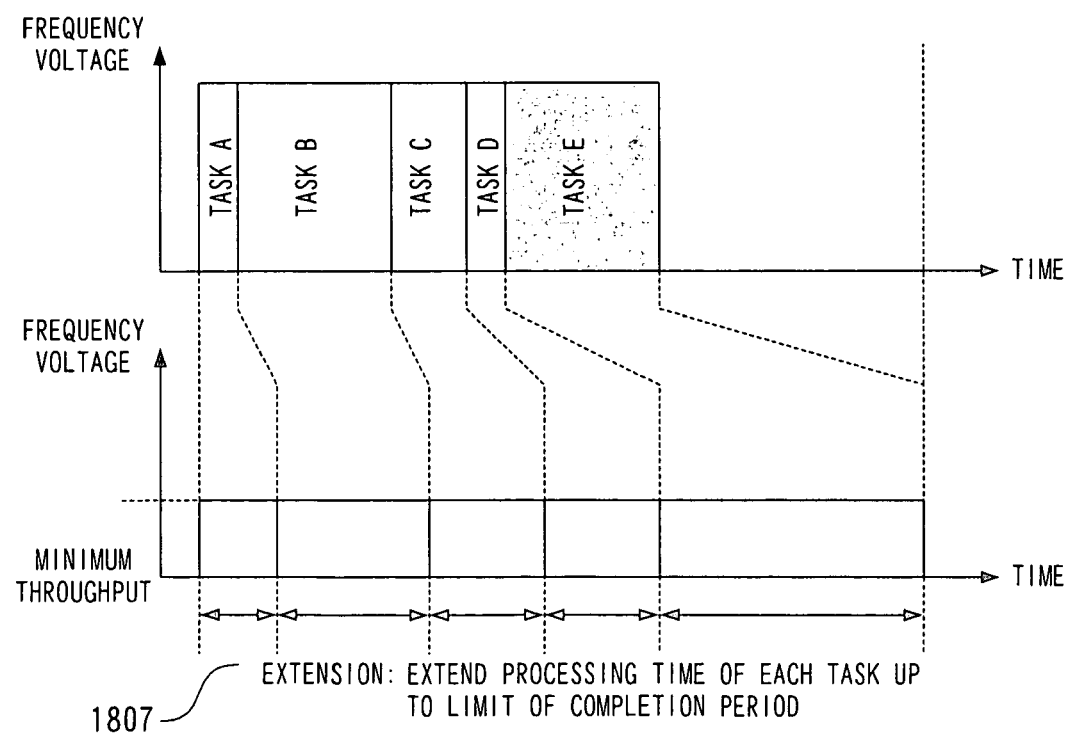
FIG. 21B is a diagram showing throughput control according to Embodiment 4 of the present invention.

Control on a clock frequency/power supply voltage is performed by the program necessary throughput decision circuit (1712) as shown in FIG. 20 where a low power operation is controlled by measuring a program throughput according to Embodiment 4 of the present invention, FIG. 21A indicating a measurement result of a program throughput according to Embodiment 4 of the present invention, and FIG. 21B indicating throughput control according to Embodiment 4 of the present invention. Here, a low power mode for measuring a throughput by using P1, P2, P3, and P5 is set as an operation mode. The power control information (P1, P2, P3, and P5) in this operation mode is defined as below.

P1: reset a throughput counter
P2: start incrementing the throughput counter
P3: stop incrementing the throughput counter
P5: update clock frequency/power supply voltage control according to a value of the throughput counter after five instructions First, a throughput counter (1801) is provided in the program throughput measurement circuit (1710), the throughput counter is controlled by power control information, and a program throughput is measured as indicated in a program throughput measurement result (1802).

Subsequently, information about by when a program should be completed, that is, completion period information (1803) is set in the program throughput decision circuit (1712). A minimum throughput (1804) for operating a program is calculated by using the completion period information (1803) and the throughput measurement result, so that it is possible to perform control such as extension (1807) using control signal timing (1805) outputted from the clock frequency/power supply voltage control circuit (1714). Further, clock frequency/power supply voltage control requires time for startup and stable power supply and thus an event has to be generated several cycles before. In the present embodiment, an event has to be generated four cycles before as indicated by clock frequency/power supply control timing (1806). Thus, in consideration of a pipeline stage, it is necessary to specify the control update of a clock frequency/power supply voltage five instructions before. As described above, the power control information (P5) indicates control update performed five instructions later, and thus control can be performed.

Further, a program throughput measurement result can be referred by the program throughput measurement result reference register (1711) during a program operation. As shown in FIG. 22A describing that an operation is controlled by a measurement result of a program throughput according to Embodiment 4 of the present invention and FIG. 22B indicating a decision on a throughput in consideration of the presence or absence of predication according to Embodiment 4 of the present invention, a program operation can be determined according to a throughput. FIG. 22A shows an example where an operand REF (1901) is used in a program constituted of modules A, B, and C to decide whether the module B or C should be started according to a throughput of the module A.

FIG. 22B shows, as an operation mode, an example where a throughput can be decided in consideration of the presence or absence of predication by making a definition using P0, P1, P2, P3, P4, P5, P6, and P7 as below.

P0: increment a throughput counter during C0 predication and execution
P1: increment the throughput counter during C1 predication and execution
P2: increment the throughput counter during C2 predication and execution
P3: increment the throughput counter during C3 predication and execution
P4: increment the throughput counter during C4 predication and execution
P5: increment the throughput counter during C5 predication and execution
P6: increment the throughput counter during C6 predication and execution
P7: increment the throughput counter during C7 predication and execution As described above, according to the present invention, an instruction code of each program for performing an instruction comprises a first instruction set, which includes a flag for specifying an instruction execution control function, and one or more second instruction sets including control specification information. A low power operation of each control circuit is performed for each instruction according to the instruction execution control function. Thus, without the necessity for increasing a circuit size or decoding time, it is possible to control the pipeline stage of an instruction decode and a preceding pipeline stage, achieving a low power operation of the microprocessor.

What is claimed is:

1. A low power operation control unit mounted in a microprocessor having an instruction condition executing function using a condition flag, the control unit controlling a low power operation of the microprocessor,
    the control unit comprising a first instruction set including instruction execution control function information in a specific bit field of an instruction code inputted to a microprocessor, the information being used for selecting a flag for an instruction execution control function, and one or more second instruction sets including control specification information for low power control in the specific bit field,
    wherein the control unit comprises:
    an operation mode switching circuit for switching the instruction sets to execute the first instruction set during a normal operation and execute the second instruction set during a low power operation;
    a predicate decision circuit for reading a flag corresponding to the instruction execution control function information in a first instruction set mode to discriminate an instruction execution control operation;
    a control specification information extraction circuit for extracting control specification information of a control circuit for reading the control specification information in a second instruction set mode and performing a low power operation; and
    a controlling unit for performing a low power operation of each control circuit by using the control specification information,
    wherein the instruction execution control function information and the control specification information are provided beforehand in each program for executing an instruction, and a low power operation of each control circuit is performed for each instruction according to the control specification information, thereby controlling a low power operation of the microprocessor for each instruction.

2. A low power operation control unit mounted in a microprocessor having an instruction condition executing function using a condition flag, the control unit controlling a low power operation of the microprocessor, the control unit comprising a first instruction set including instruction execution control function information in a specific bit field of an instruction code inputted to a microprocessor, the information being used for selecting a flag for an instruction execution control function, and one or more second instruction sets including control specification information for low power control in the specific bit field, wherein the control unit comprises:

an operation mode switching circuit for switching the instruction sets to execute the first instruction set during a normal operation and execute the second instruction set during a low power operation;

a predicate decision circuit for reading a flag corresponding to the instruction execution control function information in a first instruction set mode to discriminate an instruction execution control operation;

an event generating unit for reading the control specification information in a second instruction set mode and generating an event according to the control specification information; and a controlling unit for performing a low power operation of each control circuit in response to the event, wherein the instruction execution control function information and the control specification information are provided beforehand in each program for executing an instruction, and a low power operation of each control circuit is performed for each instruction according to the control specification information, thereby controlling a low power operation of the microprocessor for each instruction.

3. The low power operation control unit according to claim 1, wherein the control circuit is an operation stop deciding unit for deciding an operation stopping point on a specific point of a program, the controlling unit is an operation stop control unit for performing control to stop an operation on a given point of the microprocessor based on a decision result of the operation stop deciding unit, and a low power operation of the microprocessor is controlled for each instruction by performing control to stop an operation on the given point of the microprocessor.

4. The low power operation control unit according to claim 1, wherein the control circuit is a power supply voltage deciding unit for deciding control on a power supply voltage on a specific point of a program, the controlling unit is a power supply voltage controlling unit for controlling a power supply voltage of the microprocessor based on a decision result of the power supply voltage deciding unit, and a low power operation of the microprocessor is controlled for each instruction by controlling a power supply voltage of the microprocessor.

5. The low power operation control unit according to claim 1, wherein the control circuit is a transistor body bias deciding unit for deciding control on a transistor body bias on a specific point of a program, the controlling unit is a transistor body bias controlling unit for controlling a transistor body bias of the microprocessor based on a decision result of the transistor body bias deciding unit, and a low power operation of the microprocessor is controlled for each instruction by controlling a transistor body bias of the microprocessor.

6. The low power operation control unit according to claim 1, wherein the control circuit is a clock frequency deciding unit for deciding control on a clock frequency on a specific point of a program, the controlling unit is a clock frequency controlling unit for performing control on a clock frequency based on a decision result of the clock frequency deciding unit, and a low power operation of the microprocessor is controlled for each instruction by controlling a clock frequency of the microprocessor.

7. The low power operation control unit according to claim 2, wherein one or more target microprocessors, each being a microprocessor other than the microprocessor comprising the event generating unit, or data processing units, comprise, as the controlling unit, an operation controlling unit for controlling a low power operation of the microprocessor or the data processing unit, thereby controlling a low power controlling operation of the microprocessor or the data processing unit by the microprocessor comprising the event generating unit.

8. The low power operation control unit according to claim 2, wherein one or more target microprocessors, each being a microprocessor other than the microprocessor comprising the event generating unit, or data processing units, comprise, as the controlling unit, a power supply controlling unit for controlling a lower power controlling operation by controlling a power supply of the target microprocessor or the data processing unit, thereby controlling a low power controlling operation of the target microprocessor or data processing unit by the microprocessor comprising the event generating unit.

9. A program optimizing apparatus for the low power operation control unit according to claim 1, the apparatus being a microprocessor program optimizing apparatus generating the instruction code, the apparatus comprising:

a power consumption calculating unit for calculating a power consumption of operation stop control, power supply voltage control, transistor body bias control, or clock frequency control based on power consumption information of a microprocessor;

an operation control candidate calculating unit for calculating a power consumption of an operation control circuit candidate of each instruction by using the power consumption; and a switching deciding unit for selecting an operation control circuit of each instruction to minimize the power consumption, wherein the operation stop control is an operation stop control performed by the controlling unit on a given point of the microprocessor based on a decision result of an operation stop deciding unit, the power supply voltage control is a power supply voltage control performed by the controlling unit on the microprocessor based on a decision result of a power supply voltage deciding unit, the transistor body bias control is a transistor body bias control performed by the controlling unit on the microprocessor based on a decision result of a transistor body bias deciding unit, and the clock frequency control is a clock frequency control performed by the controlling unit based on a decision result of a clock frequency deciding unit, wherein an instruction set switching instruction for switching the first instruction set and the second instruction set is inserted, and the control specification information of the second instruction set is determined, thereby optimizing a program for performing a low power operation control is optimized.

10. A low power operation control unit mounted in a microprocessor having an instruction condition executing function using a condition flag, the control unit controlling a low power operation of the microprocessor, the control unit comprising a first instruction set including instruction execution control function information in a specific bit field of an instruction code inputted to a microprocessor, the information being used for selecting a flag for an instruction execution control function, and one or more second instruction sets including control specification information for low power control in the specific bit field, wherein the control unit comprises:

an operation mode switching circuit for switching the instruction sets to execute the first instruction set during a normal operation and execute the second instruction set during a low power operation;

a predicate decision circuit for reading a flag corresponding to the instruction execution control function information in a first instruction set mode to discriminate an instruction execution control operation;

a control specification information extraction circuit for reading the control specification information in a second instruction set mode and extracting control specification information of a control circuit for performing a low power operation;

a program throughput measuring unit for measuring a throughput on a specific point of a program by using the control specification information;

a throughput deciding unit for deciding an optimum power consumption for each program based on the throughput; and a frequency/power supply controlling unit for controlling a frequency and a power supply voltage during program execution to have the optimum power consumption, wherein a low power operation of the microprocessor is controlled for each instruction by measuring a throughput of a program corresponding to each instruction.

11. A low power operation control unit mounted in a microprocessor having an instruction condition executing function using a condition flag, the control unit controlling a low power operation of the microprocessor, the control unit comprising a first instruction set including instruction execution control function information in a specific bit field of an instruction code inputted to a microprocessor, the information being used for selecting a flag for an instruction execution control function, and one or more second instruction sets including control specification information for low power control in the specific bit field, wherein the control unit comprises:

an operation mode switching circuit for switching the instruction sets to execute the first instruction set during a normal operation and execute the second instruction set during a low power operation;

a predicate decision circuit for reading a flag corresponding to the instruction execution control function information in a first instruction set mode to discriminate an instruction execution control operation;

a control specification information extraction circuit for reading the control specification information in a second instruction set mode and extracting control specification information of a control circuit for performing a low power operation;

a program throughput measuring unit for measuring a throughput on a specific point of a program by using the control specification information; and a throughput referring unit for making reference to the throughput as a variable in a program of the microprocessor, wherein reference is made, during program execution, to a program throughput obtained for each instruction of a program operation.

* * * * *